(12) United States Patent
Hirai

(10) Patent No.: US 7,850,376 B2
(45) Date of Patent: Dec. 14, 2010

(54) IMAGE PICKUP APPARATUS

(75) Inventor: Futoshi Hirai, Kawasaki (JP)

(73) Assignee: Canon Kabushiki Kaisha (JP)

( * ) Notice: Subject to any disclaimer, the term of this patent is extended or adjusted under 35 U.S.C. 154(b) by 609 days.

(21) Appl. No.: 11/829,896

(22) Filed: Jul. 28, 2007

(65) Prior Publication Data

US 2008/0049325 A1  Feb. 28, 2008

(30) Foreign Application Priority Data

Jul. 31, 2006 (JP) .............................. 2006-208652

(51) Int. Cl.
*G03B 17/00* (2006.01)
(52) U.S. Cl. ...................... 396/529; 348/360
(58) Field of Classification Search ............... 396/529; 348/360
See application file for complete search history.

(56) References Cited

U.S. PATENT DOCUMENTS

| | | | |
|---|---|---|---|
| 6,683,652 B1 * | 1/2004 | Ohkawara et al. ........... | 348/347 |
| 6,791,608 B1 * | 9/2004 | Miyazawa .................. | 348/246 |
| 2003/0173203 A1 * | 9/2003 | Miki .......................... | 200/529 |
| 2004/0202464 A1 * | 10/2004 | Miyasaka et al. ........... | 396/529 |
| 2007/0166026 A1 * | 7/2007 | Matsuzawa et al. ......... | 396/529 |

FOREIGN PATENT DOCUMENTS

| | | |
|---|---|---|
| JP | 2000-125152 A | 4/2000 |
| JP | 2003-272474 A | 9/2003 |
| JP | 2003-330082 A | 11/2003 |
| JP | 2004-032191 A | 1/2004 |
| JP | 2004-341265 A | 12/2004 |

OTHER PUBLICATIONS

Translation of JP Publication No. 2000-125152; Image Pickup Device; Yasuyuki Ikeda; Publication Date: Apr. 28, 2000.*
Translation of JP Publication No. 2003-319219; Electronic Camera; Yoichi Sawachi; Publication Date: Nov. 7, 2003.*

* cited by examiner

*Primary Examiner*—Rodney E Fuller
*Assistant Examiner*—Fang-Chi Chang
(74) *Attorney, Agent, or Firm*—Rossi, Kimms & McDowell LLP

(57) ABSTRACT

An image pickup apparatus which is capable of effectively removing dust attached to an optical member due to mounting/removing of a photographic lens in a power-off state, to thereby prevent degradation of image quality. In the image pickup apparatus, when position information of a contact brush that moves in a manner interlocked with mounting/removing of the photographic lens differs immediately after execution of power-on operation from position information obtained immediately after execution of power-off operation, it is determined that photographic lens mounting/removing operation was carried out during power-off, and a camera microcomputer outputs a warning advising cleaning of the optical member.

23 Claims, 29 Drawing Sheets

DIRECTION OF LENS OPTICAL AXIS

IMAGE PICKUP APPARATUS

BACKGROUND OF THE INVENTION

1. Field of the Invention

The present invention relates to an image pickup apparatus, such as a digital single-lens reflex camera, on which has a photographic lens is removably held.

2. Description of the Related Art

Conventionally, in an image pickup apparatus of the above-mentioned type, countermeasures are taken to prevent degradation of image quality due to dust attached to an optical member, such as a low-pass filter, disposed between a photographic lens and an image pickup element that converts light incident thereon from the photographic lens into an electric signal.

For example, an image pickup apparatus has been made commercially practical in which a member disposed between a photographic lens and an image pickup element is ultrasonically vibrated to thereby remove dust attached to the member. Further, there have been proposed an image pickup apparatus in which the number of times of attachment/detachment of a detachable low-pass filter is counted, and when the count reaches a predetermined value, cleaning of the low-pass filter is recommended (see e.g. Japanese Laid-Open Patent Publication (Kokai) No. 2000-125152), and another in which a dust-removing mechanism is operated in response to the mounting of a photographic lens (see e.g. Japanese Laid-Open Patent Publication (Kokai) No. 2003-330082).

However, neither Japanese Laid-Open Patent Publication (Kokai) No. 2000-125152 nor Japanese Laid-Open Patent Publication (Kokai) No. 2003-330082 discloses a technique for coping with dust attached to a photographic lens mounted in a power-off state of the image pickup apparatus or with a battery removed from the apparatus. When considering situations in which image pickup apparatuses capable of exchanging photographic lenses are used, exchange of photographic lenses is performed more often in the power-off state than in the power-on state. However, in the image pickup apparatuses disclosed in the above-mentioned Patent Publications, in each of which mounting/removing of a photographic lens is electrically detected, it is impossible to detect the exchange of photographic lenses performed in the power-off state.

On the other hand, if the dust-removing mechanism is configured to be operated whenever the power is turned on, irrespective of whether or not a lens mounting/removing operation has been performed, an inconvenience occurs when the power is repeatedly turned on and off over a short time period without mounting or demounting a lens or when the apparatus returns from a sleep state (power-saving state where the operation of the apparatus is temporarily stopped) to an ON state. That is, the dust-removing mechanism is operated even when it is not required, which is undesirable in terms of power consumption and operation durability. Therefore, it is important to be able to detect, when the power is turned on again, whether or not a photographic lens-mounting/removing operation has been performed in the power-off state.

SUMMARY OF THE INVENTION

The present invention provides an image pickup apparatus which is capable of detecting, when the power is turned on again, whether or not a photographic lens-mounting/removing operation has been performed in the power-off state so as to effectively remove dust attached to an optical member, to thereby prevent degradation of image quality.

According to the present invention, there is provided an image pickup apparatus on which a photographic lens is removably held, comprising a movable unit configured to move in a manner interlocked with mounting/removing of the photographic lens, a position detecting unit configured to detect a position of the movable unit, and a determination unit configured to determine, based on position information on the movable unit detected by the position detecting unit, whether or not the photographic lens was mounted/removed.

With the arrangement of the present invention, if information on the position of the movable unit that moves in a manner interlocked with the mounting/removing of the photographic lens differs upon turn-on of the power from the information obtained immediately before turn-off of the power, it is determined that a photographic lens mounting/removing operation was performed in the power-off state.

A dust-removing mechanism can be driven based on the result of the determination, so that it is possible to effectively remove dust attached to the optical member, to thereby avoid picking up the image of the dust and prevent degradation of image quality.

The image pickup apparatus can comprises a processing unit configured to carry out processing for cleaning an optical member when the determination unit determines that the photographic lens was mounted/removed.

The optical member can be disposed between an image pickup element for converting light incident thereon from the photographic lens into an electric signal, and the photographic lens.

The image pickup apparatus can comprise a storage unit configured to store the position information on the movable unit detected by the position detecting unit, and the determination unit can determine, based on the position information stored in the storage unit, whether or not the photographic lens was mounted/removed.

When the position information on the movable unit detected after execution of a power-off operation and the position information on the movable unit detected after execution of a power-on operation differ from each other, the determination unit can determine that the photographic lens was mounted/removed.

The image pickup apparatus can comprise an unlocking member configured to release engagement of the photographic lens, and the movable unit can move in a manner interlocked with an operation of the unlocking member.

The image pickup apparatus can comprise a movement-converting unit including a rectilinear slide member configured to be capable of moving along an optical axis of the photographic lens in a manner interlocked with the operation of the unlocking member, and a rotary member provided with the movable unit and connected to the rectilinear slide member via a cam engagement part, the movement-converting unit converting movement of the rectilinear slide member along the optical axis to rotation of the rotary member by cam action of the cam engagement part.

The image pickup apparatus can comprise an engagement unit for engagement with the photographic lens, and the movable unit can move in a manner interlocked with an operation for mounting/removing the photographic lens to/from the engagement unit.

The image pickup apparatus can comprise a movement-converting unit including a rectilinear slide member configured to be capable of moving along an optical axis of the photographic lens in a manner interlocked with an operation for mounting/removing the photographic lens to/from the engagement unit, and a rotary member provided with the movable unit and connected to the rectilinear slide member via a cam engagement part, the movement-converting unit converting movement of the rectilinear slide member along the optical axis to rotation of the rotary member by cam action of the cam engagement part.

The engagement unit have a plurality of arcuate bayonet lugs circumferentially arranged, and the rectilinear slide member is disposed between circumferentially adjacent ones of the bayonet lugs.

The position detecting unit can include a conductive member provided in the movable unit, and an electric circuit member having a plurality of conductive traces, and the electric circuit member can detect at least two items of position information each according to a position of the conductive member.

The image pickup apparatus can comprise an unlocking member configured to release engagement of the photographic lens, and a drive unit configured to drive the movable unit, and the movable unit can be configured to be movable between a first position and a second position, and when a power-off operation is carried out, the movable unit can be driven by the drive unit to shift to the first position to be held in the first position, and when the unlocking member is operated, the movable unit can shift to the second position in a manner interlocked with the operation of the unlocking member, to be held in the second position, wherein when the position information on the movable unit detected after execution of the power-off operation and the position information on the movable unit detected after execution of the power-on operation differ from each other, the determination unit can determine that the photographic lens was mounted/removed.

The image pickup apparatus can comprise an unlocking member configured to release engagement of the photographic lens, and a drive unit configured to drive the movable unit, and the movable unit can be configured to be movable between a first position and a second position, and the movable unit can be driven by the drive unit to shift to the first position to be held in the first position, when a power-off operation is carried out, and shifts to the second position in a manner interlocked with the operation of the unlocking member, to be held in the second position, wherein when the position information on the movable unit detected after execution of the power-off operation and the position information on the movable unit detected after execution of a power-on operation differ from each other, the determination unit can determine that the photographic lens was mounted/removed.

The engagement unit can have a plurality of arcuate bayonet lugs circumferentially arranged, and the movable unit can be disposed between circumferentially adjacent ones of the bayonet lugs.

The movable unit can be configured to be movable along the optical axis of the photographic lens, and can be provided with a toggle spring for urging the movable unit toward one side or an opposite side in a direction along the optical axis.

The position detecting unit can optically detect the position of the movable unit.

The position detecting unit can electrically detect the position of the movable unit.

The image pickup apparatus comprises a vibrator unit configured to provide vibration to the optical member, and when the determination unit determines that the photographic lens was not mounted/removed, the processing unit can drive the vibrator unit by a first control, and when the determination unit determines that the photographic lens was mounted/removed, the processing unit can drive the vibrator unit by a second control.

The first control causes the vibrator unit not to be driven, and the second control causes the vibrator unit to be driven for a predetermined time period.

The first control can cause the vibrator unit to be driven for a predetermined time period, and the second control can cause the vibrator unit to be driven for a longer time period than the predetermined time period.

When the determination unit determines that the photographic lens was mounted/removed, the processing unit can carry out warning processing to advise cleaning of the optical member.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
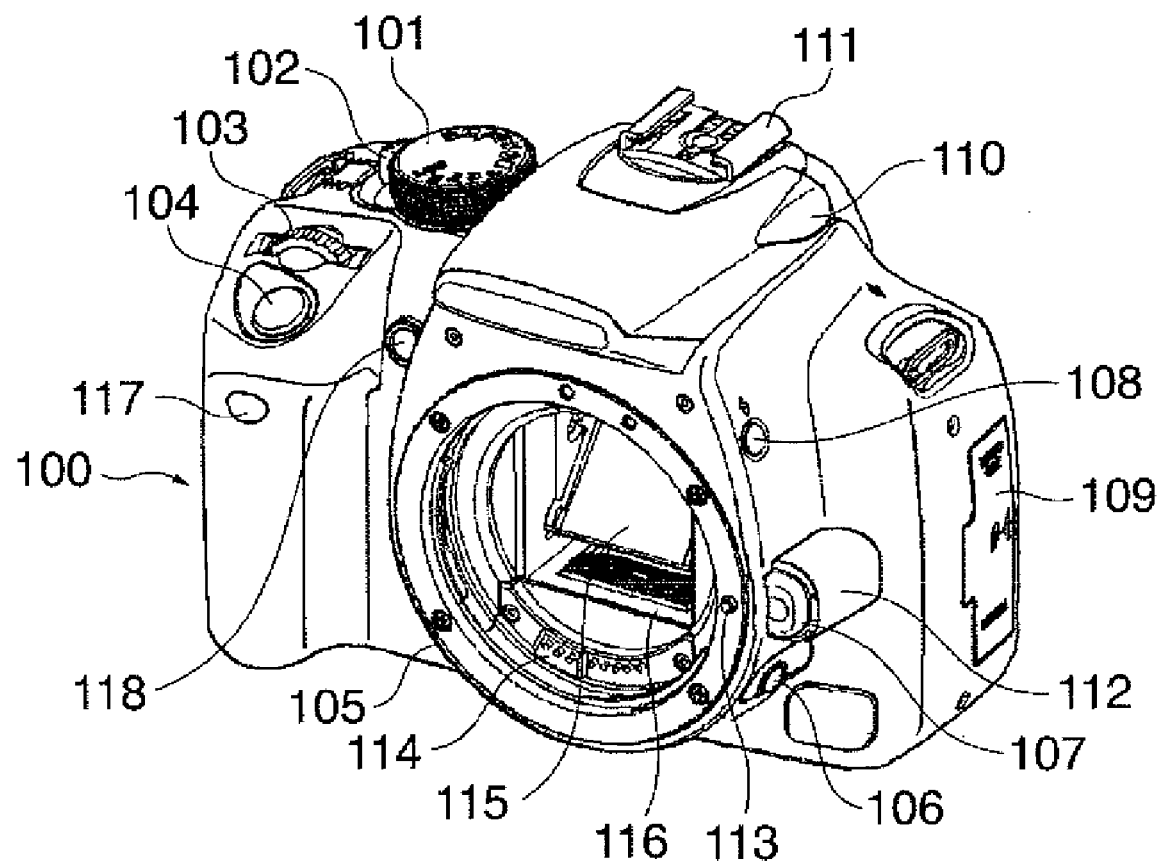
FIG. 1 is a perspective view of a digital single-lens reflex camera according to a first embodiment of the present invention, as viewed from an object side.
Figure 2:
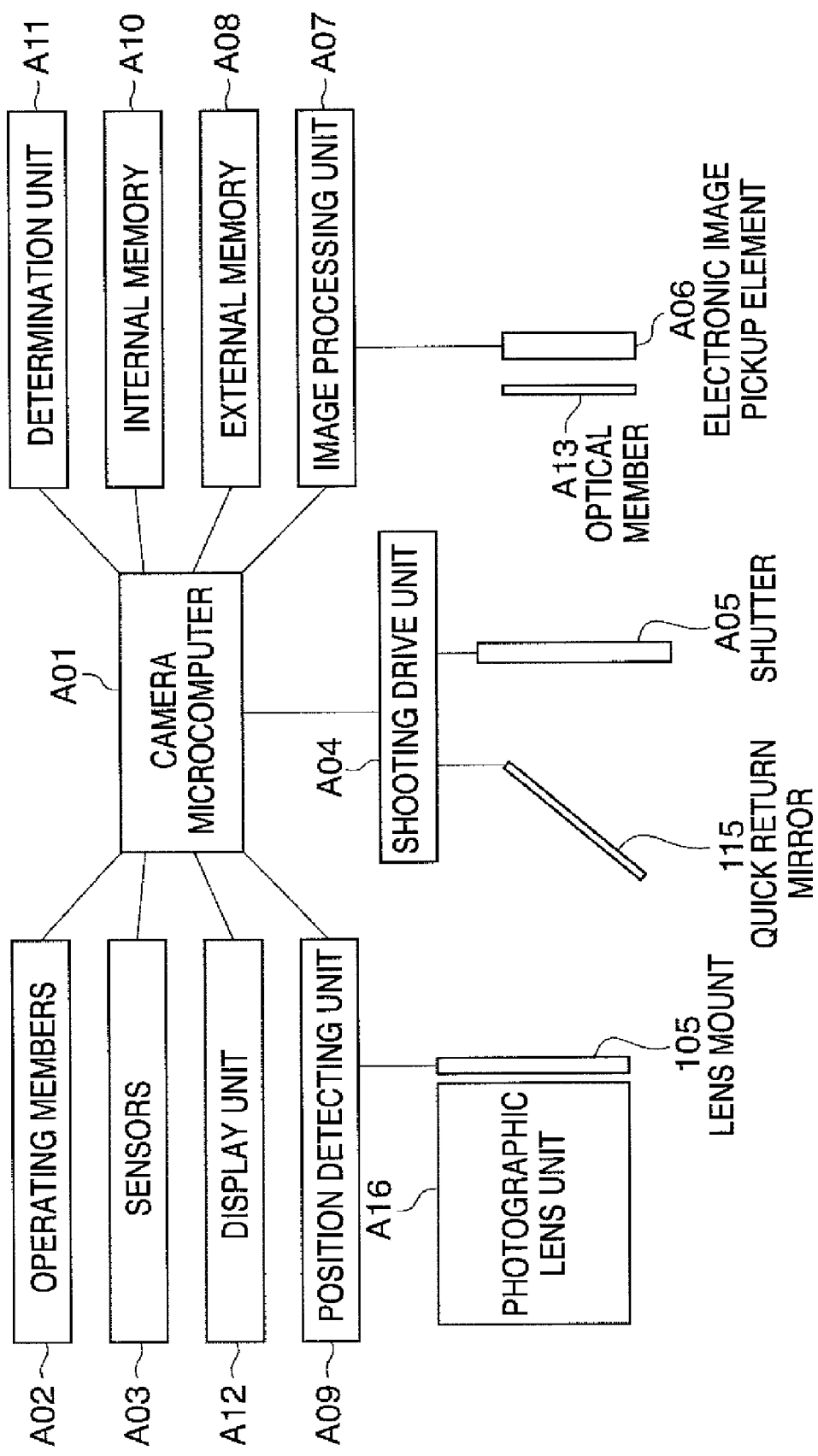
FIG. 2 is a control block diagram of the digital single-lens reflex camera according to the first embodiment.

FIG. 1 is a perspective view of a digital single-lens reflex camera according to a first embodiment of the present invention, as viewed from an object side, in a state where a photographic lens unit is removed therefrom. FIG. 2 is a control block diagram of the digital single-lens reflex camera.

As shown in FIG. 1, the digital single-lens reflex camera (image pickup apparatus) according to the first embodiment has a lens mount 105 provided as a part for use in mounting the photographic lens unit A16 (see FIG. 2) to a camera body 100 via a bayonet mechanism. The camera body 100 has communication pins 114 projecting therefrom for identifying the type of the photographic lens unit A16 mounted to the camera body 100.

Next, an operation carried out by a photographer before shooting will be described with reference to FIGS. 1 and 2.

As shown in FIGS. 1 and 2, when the photographer mounts the photographic lens unit A16 to the camera body 100 and turns a power switch member 102 to its ON position, a camera microcomputer A01 activates the camera and recognizes the photographic lens unit A16. When the photographer sets a mode dial 101 to a desired shooting mode and then operates an electronic dial 103, the camera microcomputer A01 sets shooting conditions based on signals from operation members A02 (members including the power switch member 102, and buttons and dials, referred to hereinafter, used by the photographer for operating the camera, and collectively illustrated in FIG. 2).

If the photographer depresses a release button 104 after setting the shooting conditions, the camera microcomputer A01 drives sensors A03. For example, ranging is performed by an AF unit 116, and light metering is performed by a light-metering unit, not shown. Further, a built-in stroboscope 110 is driven to a predetermined position, if necessary. Then, when the release button 104 is further depressed, the camera microcomputer A01 drives a shooting drive unit A04. This causes a quick return mirror 115 to be driven to retreat from a photographic optical path, and at the same time a shutter curtain of a shutter A05 is also driven to retreat from the photographic optical path, whereby image-forming light from an object passes through an optical member A13 to cause exposure of an electronic image pickup element A06. An electric signal subjected to photoelectric conversion by the electronic image pickup element A06 is converted to predetermined data by an image processing unit A07, and then recorded in an external memory A08.

In the case of removing the photographic lens unit A16 from the camera body 100, the photographer depresses a photographic lens unlock button (unlocking member) 107 (hereinafter simply referred to as "the unlock button 107") held in a front cover 112. When the unlock button 107 is depressed, a photographic lens lock pin 113 (hereinafter simply referred to as "the lock pin 113") is operated in an interlocked fashion to be retracted from the lens mount 105 into the camera body 100. When the lock pin 113 is retracted into the camera body 100, the photographic lens unit A16 is made rotatable, so that the photographer can rotate the entire photographic lens unit A16 to release bayonet engagement, whereby the photographic lens unit A16 can be removed from the camera body 100.

Figure 3:
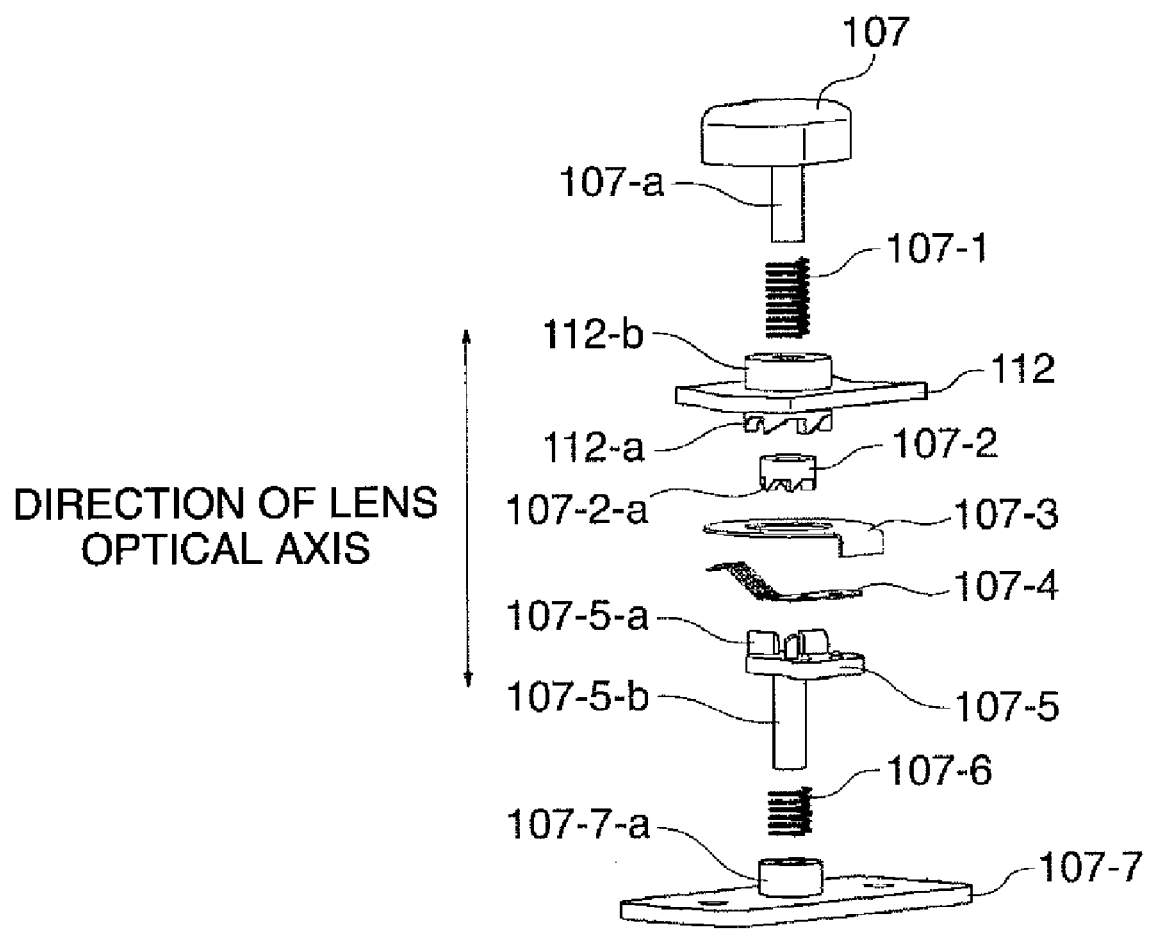
FIG. 3 is an exploded perspective view of an unlock button and a mechanism operated in a manner interlocked with operation of the unlock button.

FIG. 3 is a view of the unlock button 107 and a mechanism operated in a manner interlocked with the operation of the unlock button 107. In FIG. 3, the front cover 112 is shown broken away.

As shown in FIG. 3, the unlock button 107 has a fitting shaft 107-a extending therefrom for fitting in the front cover 112. A compression spring 107-1 is fitted on the engaging shaft 107-a, for causing the unlock button 107 to be protruded from the front cover 112 toward an object side. The front cover 112 is formed therethrough with a fitting hole 112-b for holding the unlock button 107 in a manner movable along the optical axis of a photographic lens. Further, the front cover 112 has a cam part 112-a (hereinafter referred to as "the cover cam 112") formed on a side thereof facing the inside of the camera.

A rectilinear slide cam member (slide member) 107-2 is rigidly secured to the end of the fitting shaft 107-a of the unlock button 107 with screws, not shown, from inside the camera. This prevents the unlock button 107 from falling off the front cover 112 due to the urging force of the compression spring 107-1.

The rectilinear slide cam member 107-2 is formed with a cam part 107-2-*a* (hereinafter referred to as "the button cam 107-2-*a*"). The unlock button 107 and the rectilinear slide cam member 107-2 are integrally secured to each other, and are held in the front cover 112 in a manner movable along the lens optical axis with their rotation restricted.

A phase flexible printed circuit board (position sensor unit) 107-3 having phase traces provided thereon is fixed to an inner wall of the front cover 112 facing the inside of the camera, and a contact brush (movable unit) 107-4 is in contact with the phase flexible printed circuit board 107-3, for phase trace detection. The contact brush 107-4 is fixed to a rotary cam member (rotary member) 107-5 that rotates in a manner interlocked with the operation of the unlock button 107.

The rotary cam member 107-5 is formed with a cam part 107-5-*a* (hereinafter referred to as "the rotary cam 107-5-*a*"). The rotary cam 107-5-*a* engages with the cover cam 112-*a* and the button cam 107-2-*a* to rotate the rotary cam member 107-5. The rotary cam member 107-5 has a fitting shaft 107-5-*b* extending therefrom. The fitting shaft 107-5-*b* is fitted in a base plate-fitting hole 107-7-*a* formed in a cam base plate 107-7 in a manner movable along and rotatable about the lens optical axis.

Fitted on the fitting shaft 107-5-*b* extending from the rotary cam member 107-5 is a compression spring 107-6 for urging the rotary cam member 107-5 toward the object side. The cam base plate 107-7 is rigidly secured to the front cover 112 with screws, not shown.

Figure 4:
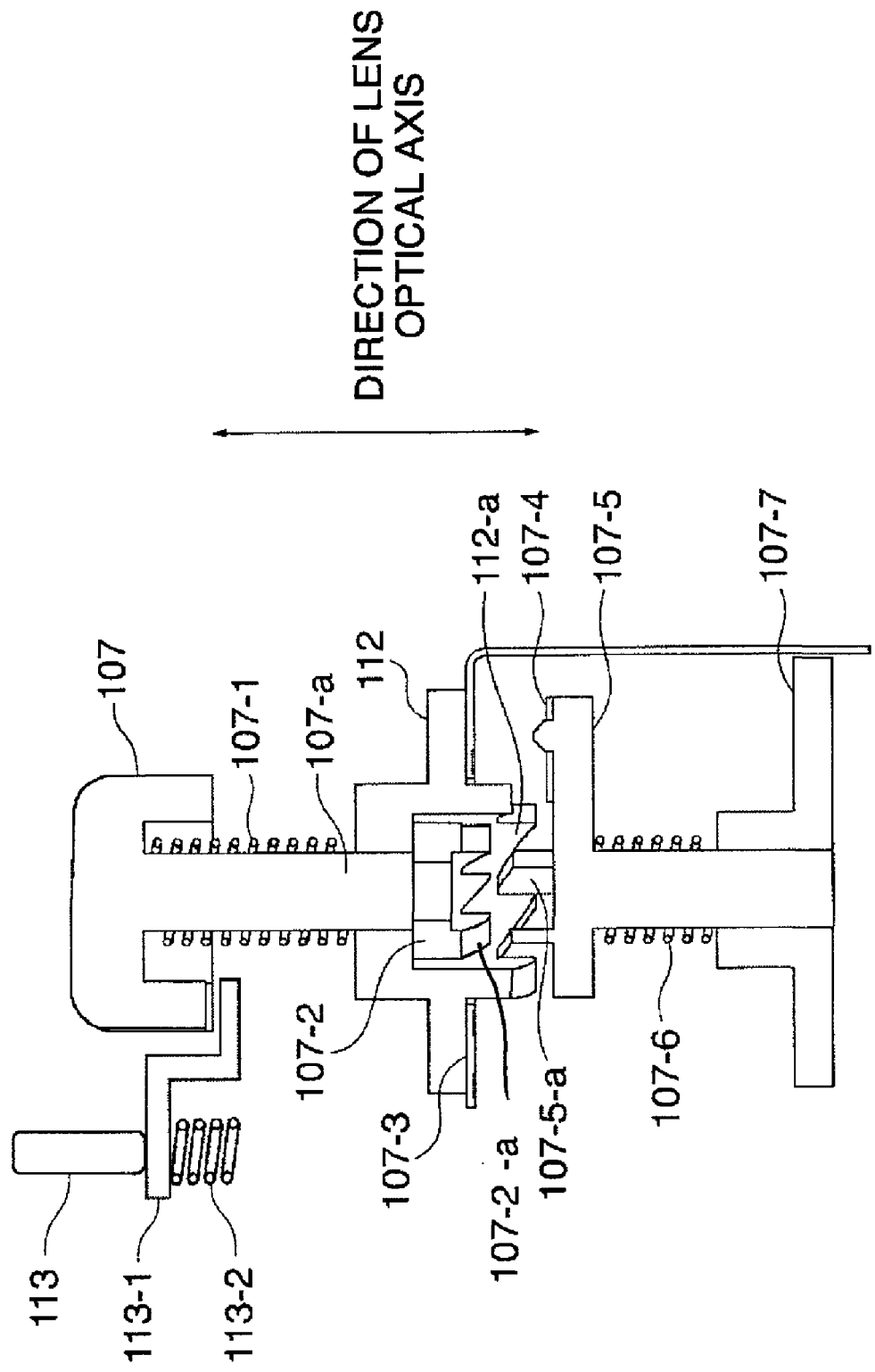
FIG. 4 is a cross-sectional view useful in explaining a state where the unlock button stays unoperated.

FIG. 4 shows the unlock button 107 in an unoperated state. In FIG. 4, the front cover 112 is shown broken away.

As shown in FIG. 4, the lock pin 113 and a linkage member 113-1 interlocked therewith are disposed such that they can be brought into contact with the unlock button 107. The lock pin 113 is urged by a lock pin spring 113-2 to protrude from the lens mount 105. The unlock button 107 is urged toward the object side by the compression spring 107-1 disposed between the front cover 112 and the unlock button 107 itself, and is held in a predetermined position by the rectilinear slide cam member 107-2 as a stopper. Unless the unlock button 107 is depressed, the cover cam 112-*a* and the rotary cam 107-5-*a* are held in contact with each other by the urging force of the compression spring 107-6 to prevent unintentional rotation of the rotary cam member 107-5.

Figure 5:
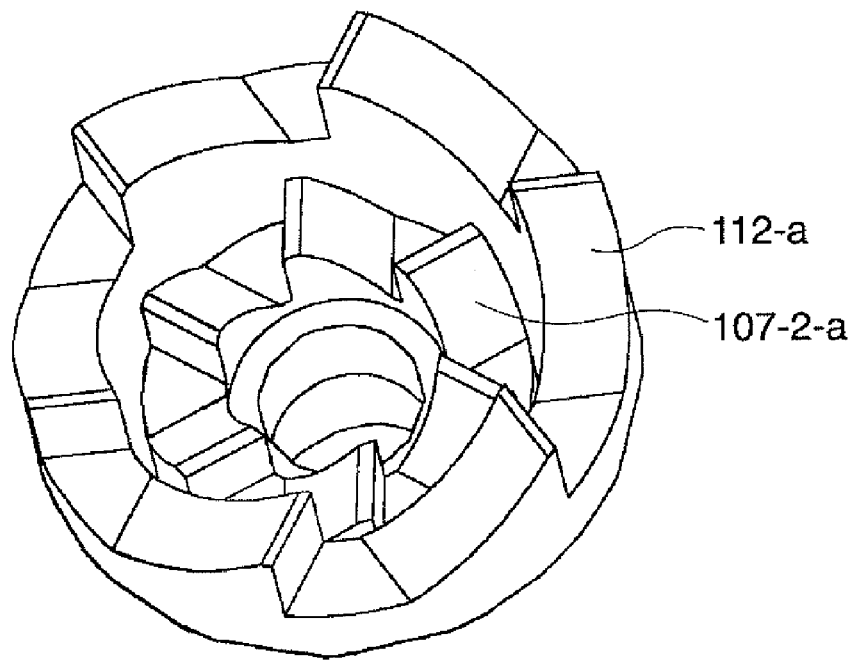
FIG. 5 is a perspective view of a cover cam and a button cam, as viewed from inside the camera.

FIG. 5 is a perspective view of the cover cam 112-*a* and the button cam 107-2-*a*, as viewed from inside the camera.

As shown in FIG. 5, the button cam 107-2-*a* is disposed inward of the cover cam 112-*a*. The cover cam 112-*a* is integrally formed with the front cover 112 on the side of the front cover 112 facing the inside of the camera. The button cam 107-2-*a* is allowed to move along the lens optical axis in accordance with movement of the unlock button 107, but rotation of the button cam 107-2-*a* is restricted. Each of the cover cam 112-*a* and the button cam 107-2-*a* is comprised of six cam parts each arranged at very 60° position, and the cover cam 112-*a* and the button cam 107-2-*a* are disposed in a manner shifted in phase from each other by approximately 30°.

Figure 6:
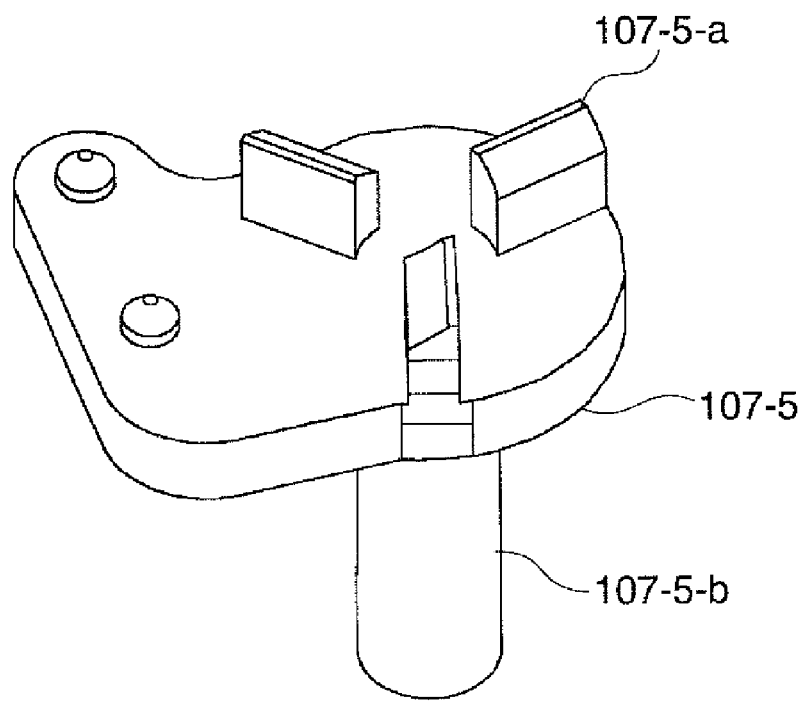
FIG. 6 is a perspective view of a rotary cam member, as viewed from the object side.

FIG. 6 is a perspective view of the rotary cam member 107-5, as viewed from the object side.

As shown in FIG. 6, the rotary cam 107-5-*a* is comprised of three cam parts each arranged at every 120° position. The length of each of the cam parts is set such that the rotary cam 107-5-*a* can be brought into contact with the cover cam 112-*a* and the button cam 107-2-*a*. The rotary cam member 107-5 performs counterclockwise rotation, as viewed from the object side, by having the rotary cam 107-5-*a* brought into contact with the cover cam 112-*a* and the button cam 107-2-*a*.

Figure 7:
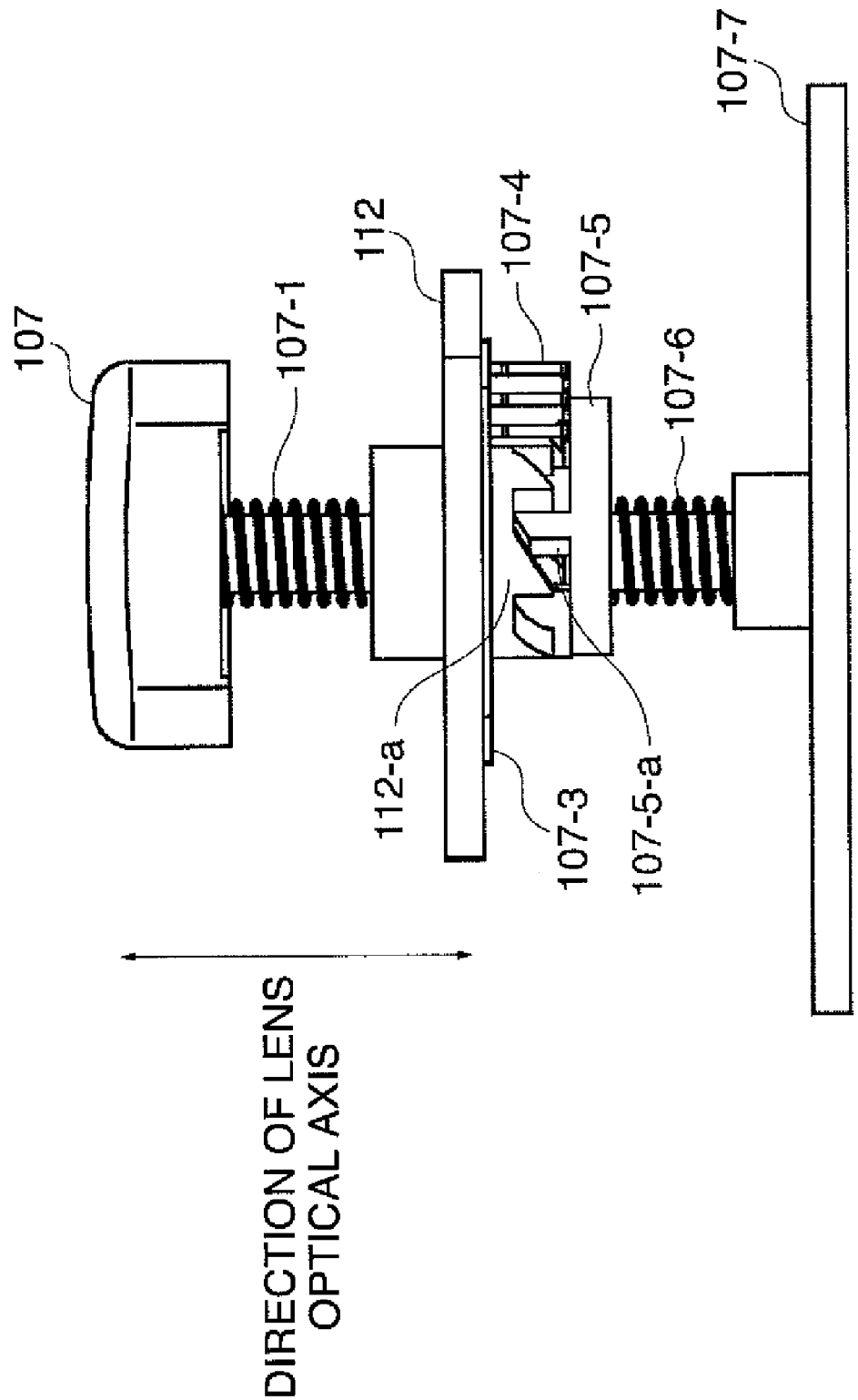
FIG. 7 is a view of the unlock button in the unoperated state.

FIG. 7 is a view of the unlock button 107 in the unoperated state. In FIG. 7, the front cover 112 is shown broken away.

As shown in FIG. 7, in a state where the unlock button 107 is not operated, the cover cam 112-*a* and the rotary cam 107-5-*a* are held in contact with each other, and the contact brush 107-4 is in contact with the phase flexible printed circuit board 107-3.

Figure 8:
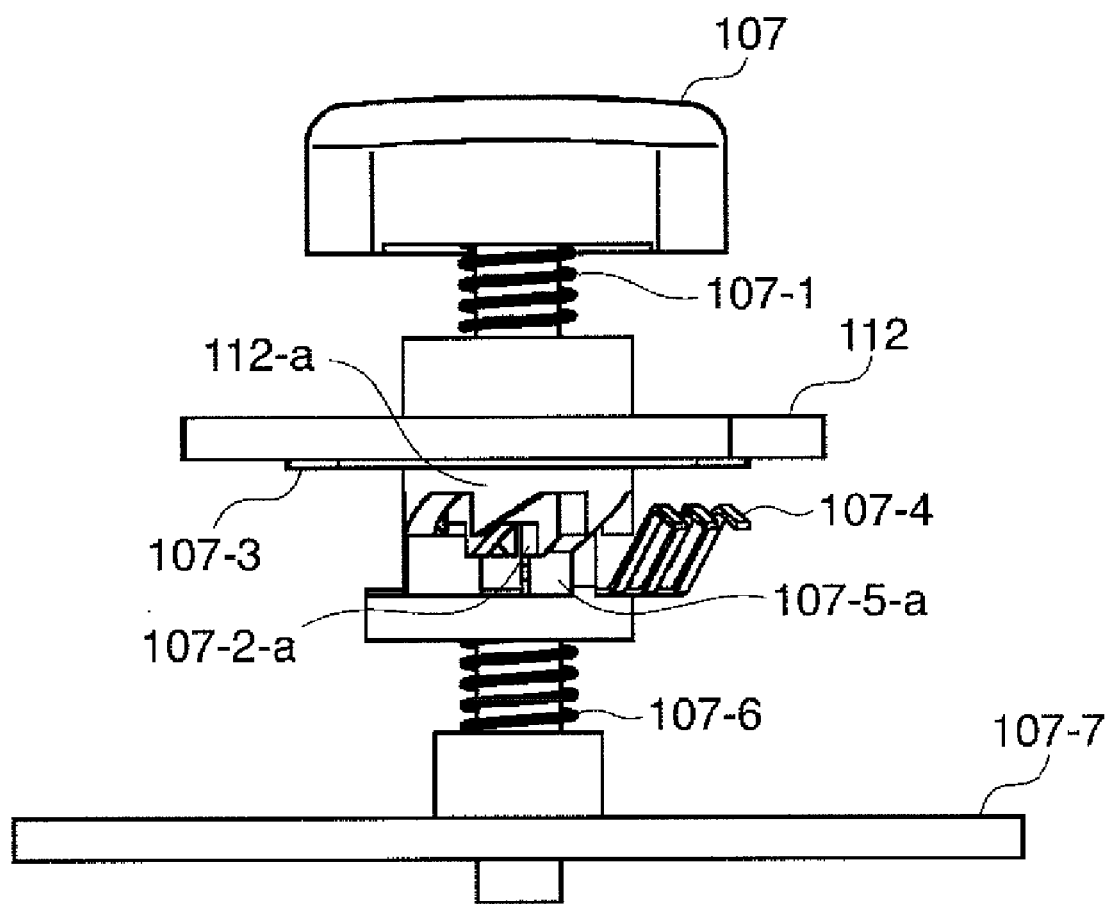
FIG. 8 is a view of the unlock button in a state being operated.

Then, when the unlock button 107 is depressed, as shown in FIG. 8, the rectilinear slide cam member 107-2 moves toward a photographer side together with the unlock button 107, whereby the button cam 107-2-*a* starts to be brought into contact with the rotary cam 107-5-*a*. When the button cam 107-2-*a* is brought into contact with the rotary cam 107-5-*a*, due to engagement of cam surfaces of the respective cams, the rotary cam member 107-5 starts rotation while moving toward the photographer side. When the rotary cam 107-5-*a* of the rotary cam member 107-5 is moved to be closer to the photographer than the cover cam 112-*a* is, i.e. when the rotary cam 107-5-*a* has moved to a position where it is not in contact with the cover cam 112-*a*, the rotary cam member 107-5 has rotated through approximately 30°.

When the unlock button 107 is in a depressed state, the rotary cam member 107-5 has been shifted to its photographer-side position, and therefore the contact brush 107-4 is not in contact with the phase flexible printed circuit board 107-3. Then, when the unlock button 107 is released, the unlock button 107 and the rectilinear slide cam member 107-2 start moving toward the object side by the urging force of the compression spring 107-1.

As the rectilinear slide cam member 107-2 moves toward the object side, the rotary cam member 107-5 is also moved toward the object side by the urging force of the compression spring 107-6. At this time, the rotary cam member 107-5 having been rotated through approximately 30° from a position where it was before depression of the unlock button 107 starts to come into contact with a cam surface of the cover cam 112-*a* in a phase adjacent in the counterclockwise direction to a phase in which the cover cam 112-*a* was before depression of the unlock button 107. Then, the rotary cam member 107-5 is not only moved toward the object side by the urging force of the compression spring 107-6, but also further rotated through approximately 30° by the cover cam 112-*a*.

Figure 9:
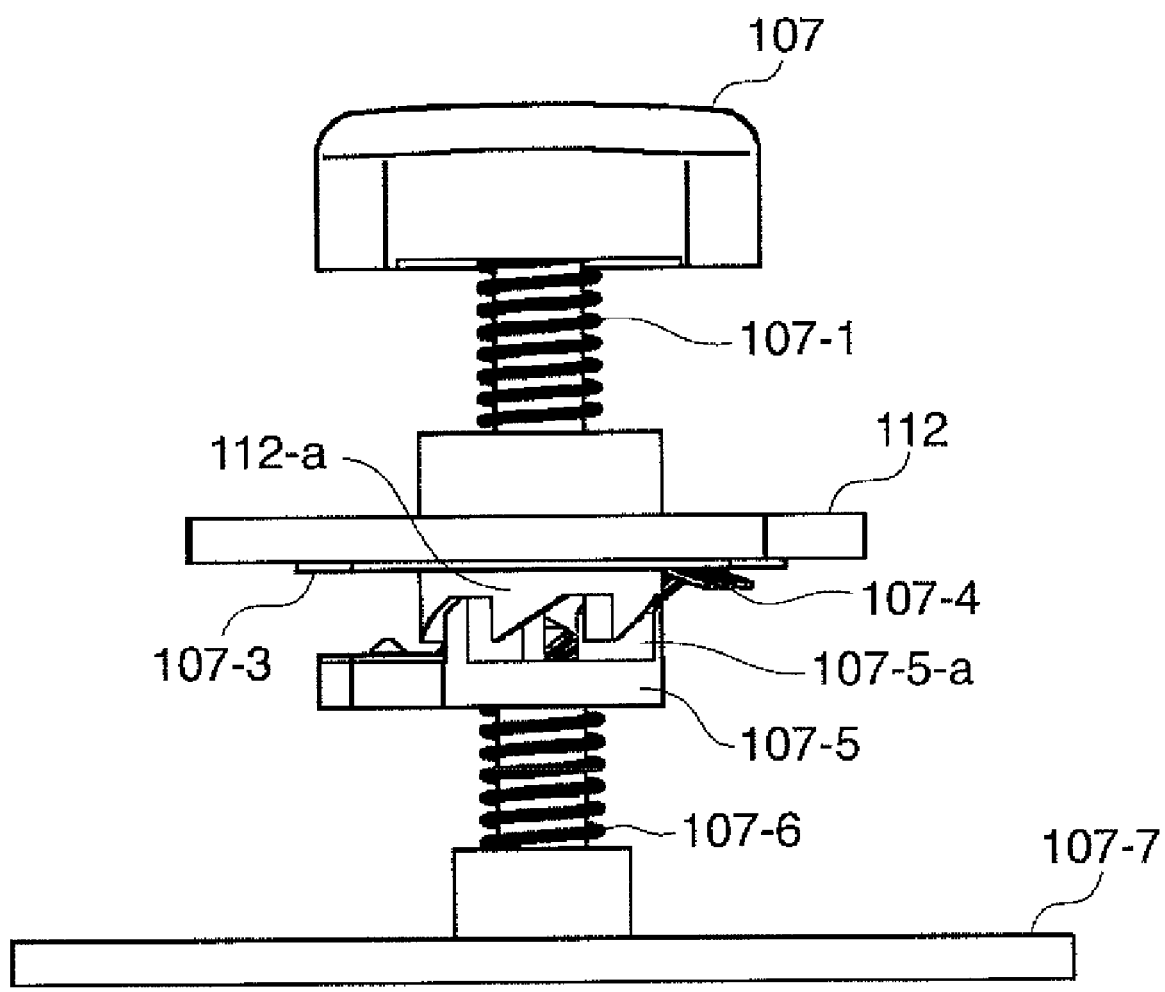
FIG. 9 is a view of the unlock button in a state where an operation thereof has been completed.

FIG. 9 shows the unlock button 107 in a state where its operation has been completed. In FIG. 9, the rotary cam member 107-5 has been rotated through 600 from the state shown in FIG. 7 by a one-time operation of the unlock button 107, and held in the state. Since the rotary cam member 107-5 has been shifted to a predetermined object-side position where it is engaged with the cover cam 112-*a*, the contact brush 107-4 fixed to the rotary cam member 107-5 is in contact with the phase flexible printed circuit board 107-3.

Figure 10:
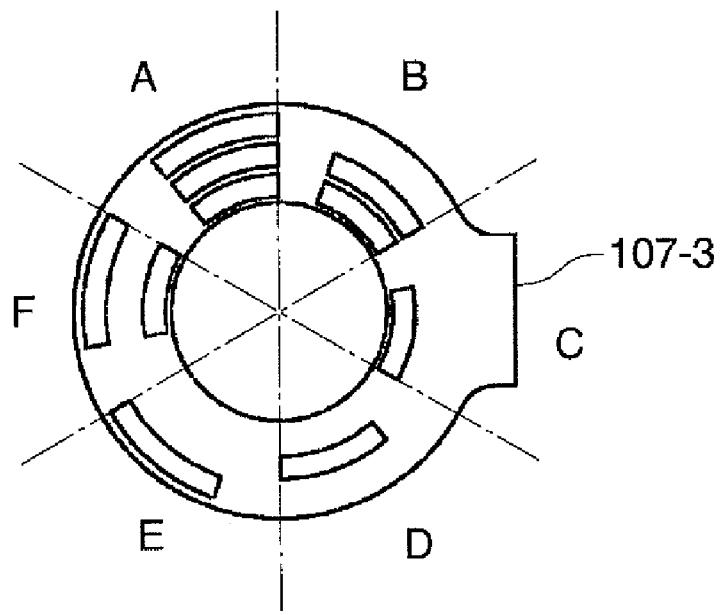
FIG. 10 is a plan view of conductive traces arranged on a phase flexible printed circuit board, as viewed from a photographer side.
Figure 11:
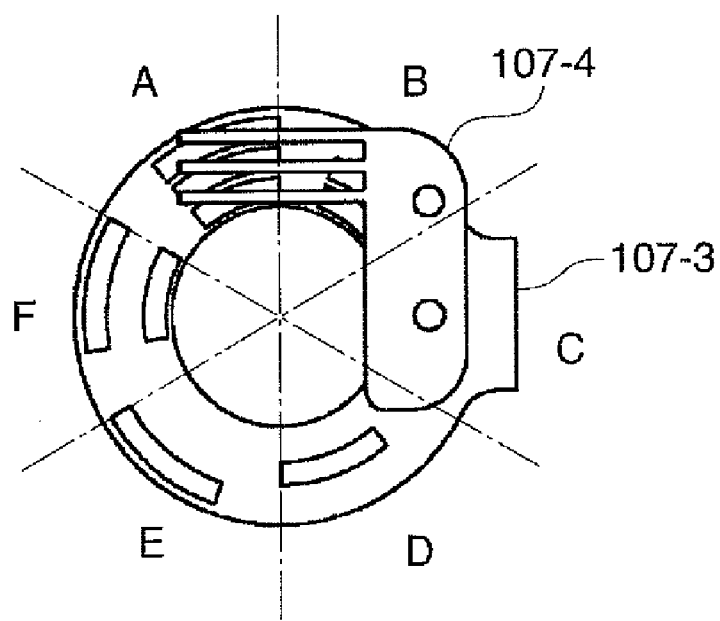
FIG. 11 is a plan view of the conductive traces with a contact brush positioned on a conductive trace A.
Figure 12:
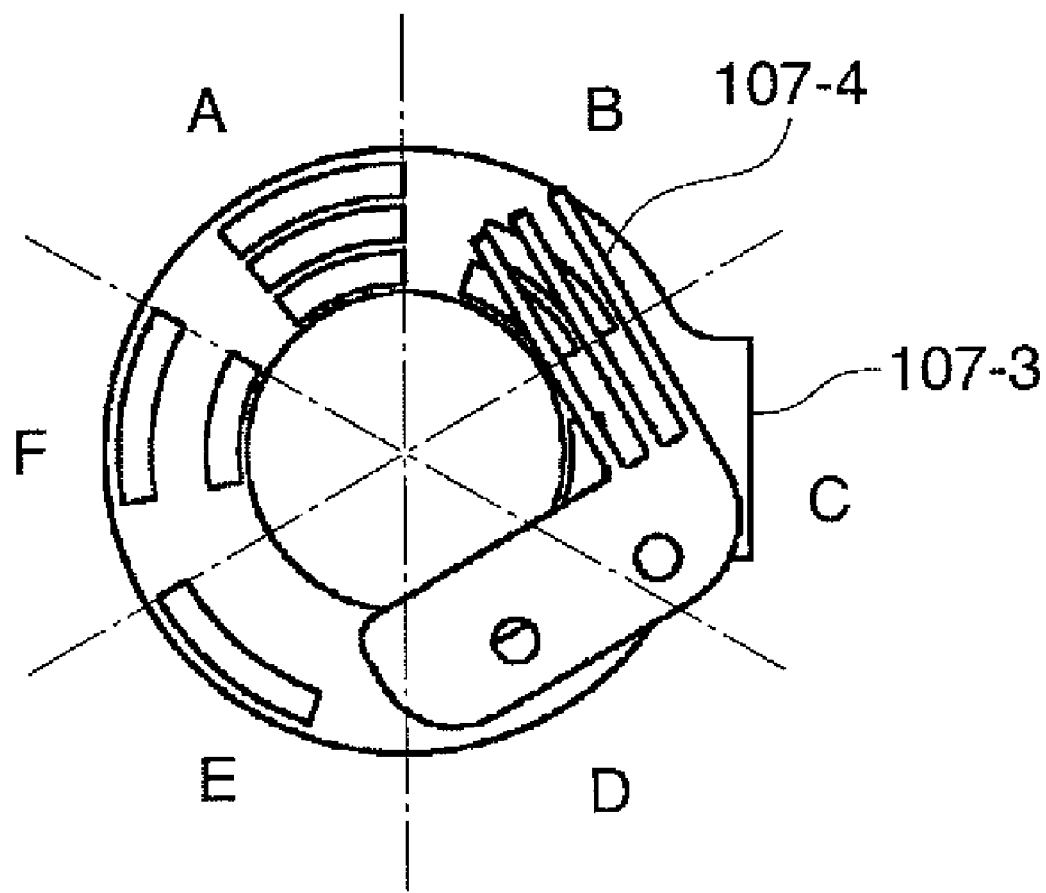
FIG. 12 is a plan view of the conductive traces with the contact brush positioned on a conductive trace B.

FIG. 10 is a plan view of conductive traces arranged on the phase flexible printed circuit board 107-3, as viewed from the photographer side. As shown in FIG. 10, six different traces are each arranged on the phase flexible printed circuit board 107-3 at every 60° position so as to detect each of six positions of the rotary cam member 107-5 through detection of a conducting state. For example, FIG. 11 shows a position of the contact brush 107-4 corresponding to FIG. 7. In FIG. 11, the contact brush 107-4 is positioned on a trace A of the phase flexible printed circuit board 107-3. Further, FIG. 12 shows a position of the contact brush 107-4 corresponding to FIG. 9. In FIG. 12, the contact brush 107-4 is positioned on a trace B of the phase flexible printed circuit board 107-3. Since the rotary cam member 107-5 is rotated through 600 by a one-time operation of the unlock button 107, the contact brush 107-4 fixed to the rotary cam member 107-5 is also rotated through 60°, whereby the contact point part of the contact brush 107-4 is shifted to an adjacent phase trace.

Although in the present embodiment, the cam parts of each of the cover cam 112-*a* and the button cam 107-2-*a* are each arranged at every 60° position, and the phase flexible printed circuit board 107-3 is provided with six conductive traces so as to identify six items of position information, it suffices that at least two items of position information can be identified.

As described above, according to the present embodiment, once the unlock button 107 is operated so as to remove the photographic lens unit A16 from the camera body 100, the contact brush 107-4 rotates to cause the phase flexible printed circuit board 107-3 to output a different signal (phase signal). Therefore, by comparing phase signals from the phase flexible printed circuit board 107-3, it is possible to determine whether or not the photographic lens unit A16 was mounted/removed.

Figure 13:
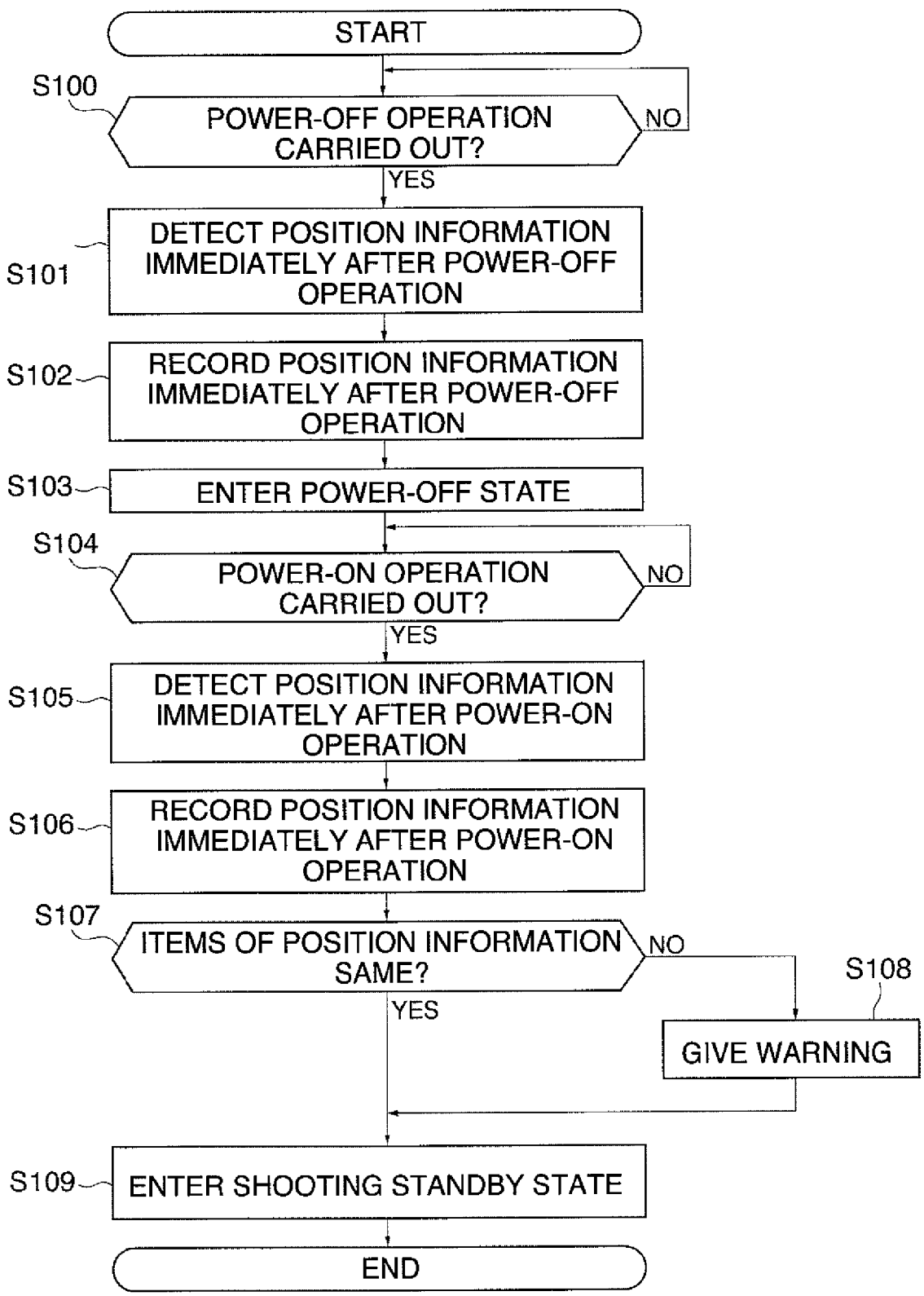
FIG. 13 is a flowchart useful in explaining an example of operation of the digital single-lens reflex camera according to the first embodiment.

Next, an example of operation of the digital single-lens reflex camera according to the first embodiment will be described with reference to FIGS. 2 and 13. In FIG. 13, a power-on state means a state where when a photographer operates any of the operation members A02, the camera performs an operation corresponding to the operated operation member A02. A power-off state means a state where even if the photographer operates any other operation member A02 than the power switch member 102, the camera never performs an operation corresponding to the operated operation member A02. When the power switch member 102 is operated, the power-off state is switched to a state where the camera is allowed to perform an operation corresponding to an operation by the photographer. The power-off state may include a sleep state as a power-saving state where the operation of the camera is temporarily stopped. In this case, when the photographer executes an operation for shooting e.g. by operating the release button 104, the sleep state is switched to the state where the camera is allowed to perform an operation corresponding to an operation by the photographer, but otherwise, the camera is not allowed to perform an operation corresponding to an operation by the photographer. The operation for mounting/removing the photographic lens unit A16 is not a direct operation for shooting, and therefore the sleep state is maintained. It should be noted that the power-on state shifts to the sleep state when none of the operation members A02 has been operated over a predetermined time period.

First, when a power-off operation is carried out using the power switch member 102 in a step S100, the process proceeds to a step S101. In the step S101, the phase flexible printed circuit board 107-3 as a position detecting unit A09 detects position information indicative of a position of the contact brush 107-4 immediately after execution of the power-off operation.

Then, in a step S102, the position information detected by the phase flexible printed circuit board 107-3 is recorded in an internal memory (storage unit) A10. Although in the present embodiment, the position information on the contact brush 107-4 is detected and recorded immediately after execution of the power-off operation, this is not limitative, but position information on the contact brush 107-4 may be periodically detected to record an item of position information detected immediately before power-off.

After the position information on the contact brush 107-4 is recorded in the internal memory A10 in the step S102, the process proceeds to a step S103, wherein the camera enters the power-off state.

When the power is turned off by the operation of the power switch member 102, the system stops, and never performs an operation corresponding to a photographer's operation on an operation member A02 until a power-on operation is carried out using the power switch member 102, even if any other operation member A02 is operated (step S104). Insofar as the operation of the release button 104 for returning the camera from the sleep state to the ON state is concerned, it may be checked by interrupt handling in the step S104 whether or not the release button 104 has been operated.

If it is determined in the step S104 that power-on operation has been carried out, the power is turned on to activate the system, followed by the process proceeding to a step S105.

In the step S105, position information on the contact brush 107-4 immediately after execution of the power-on operation is detected by the phase flexible printed circuit board 107-3 as the position detecting unit A09, and in a step S106, the position information detected by the phase flexible printed circuit board 107-3 is recorded in the internal memory (storage unit) A10.

After the position information on the contact brush 107-4 detected immediately after execution of the power-on operation is recorded in the internal memory A10, the process proceeds to a step S107, wherein a determination unit A11 performs a comparison between the position information detected immediately after execution of the power-off operation and the position information detected immediately after execution of the power-on operation, both of which have been recorded in the internal memory A10. If the two items of position information are identical, it is judged that a photographic lens mounting/removing operation was not performed, and the process proceeds to a step S109, wherein the camera enters a shooting standby state. On the other hand, if the two items of position information are not identical, it is judged that a photographic lens mounting/removing operation was performed, and the process proceeds to a step S108, wherein a warning signal is output to recommend cleaning of the optical member A13, such as a low-pass filter (hereinafter abbreviated as "the LPF"). Then, the process proceeds to the step S109, wherein the camera enters the shooting standby state.

It is desired that cleaning of the optical member A13 is recommended e.g. by causing the camera microcomputer (processing unit) A01 to display a message, such as "An image of dust can be picked up" or "Cleaning of the low-pass filter is recommended", on a display unit A12 (e.g. a liquid crystal display for monitoring picked-up images). Alternatively, an alarm advising cleaning of the optical member A13 may be given by sound.

As described above, according to the present embodiment, when the position information on the contact brush 107-4 that moves in a manner interlocked with the operation of the unlock button 107 differs immediately after execution of the power-on operation from that obtained immediately after execution of the power-off operation, it is judged that a photographic lens mounting/removing operation was carried out during the power-off state, and warning is executed to advise cleaning of the optical member A13.

As a consequence, even if a photographic lens mounting/removing operation is carried out in the power-off state or with the battery removed from the camera, resulting in attachment of dust to the optical member A13, since the above-mentioned warning is given, the dust can be cleaned off the optical member A13 before shooting is performed. Thus, it is possible to avoid picking up the image of the dust to thereby prevent degradation of image quality. It should be noted that even in the power-on state, whether or not a photographic lens mounting/removing operation was carried out may be determined by comparing items of position information on the contact brush 107-4 that moves in a manner interlocked with the operation of the unlock button 107.

Figure 14:
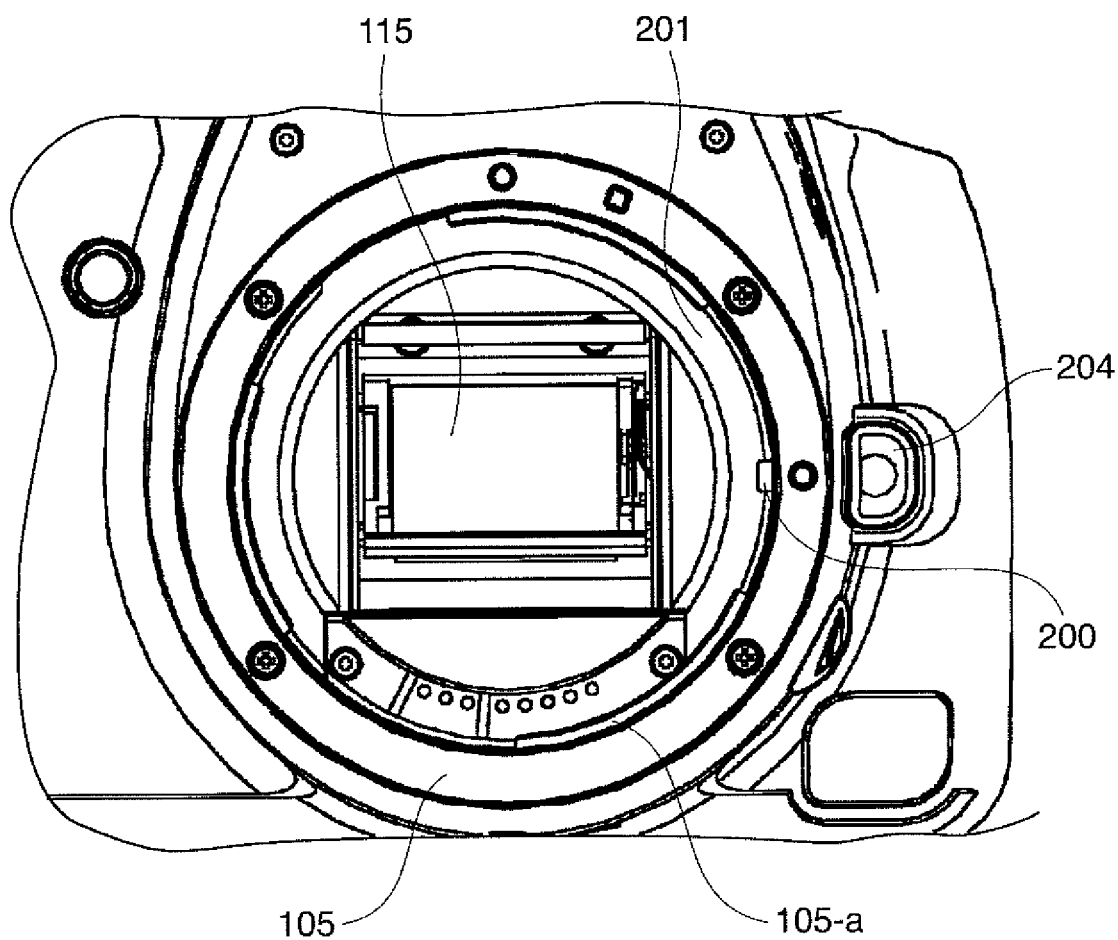
FIG. 14 is a perspective view of a lens mount and its surrounding of a digital single-lens reflex camera according to a second embodiment of the present invention, as viewed from the object side.

Next, a digital single-lens reflex camera according to a second embodiment of the present invention will be described with reference to FIGS. 14 to 23. FIG. 14 is a perspective view of a lens mount and its surrounding of the digital single-lens reflex camera according to the second embodiment, as viewed from the object side, in a state where the photographic lens unit is removed. Component parts and elements identical to those of the first embodiment are designated by identical reference numerals, and description thereof is omitted.

As shown in FIG. 14, the lens mount 105 is formed with three camera body-side bayonet lugs (engaging part) 105-*a* for bayonet engagement of the photographic lens unit A16 with the camera body 100. The bayonet lugs are each arranged at every 120° position in a manner each circumferentially extending over a range of approximately 60°. A linkage pin (rectilinear slide member) 200 is disposed between two circumferentially adjacent bayonet lugs 105-*a* (i.e. in an area where a bayonet lug 250-*a* (see FIG. 18) of the photographic lens unit A16 passes when the photographic lens unit A16 is mounted/removed to/from the camera body 100).

The linkage pin 200 is mounted to a mirror box 201 containing the quick return mirror 115, in a state movable along the lens optical axis and restrained from rotation. Although in the present embodiment, the linkage pin 200 is disposed in the vicinity of the unlock button 204, this is not limitative, but the linkage pin 200 may be mounted to the mirror box 201 at any location including other than the vicinity of the unlock button 204, insofar as interference with the bayonet lugs 105-*a* can be avoided.

Figure 15:
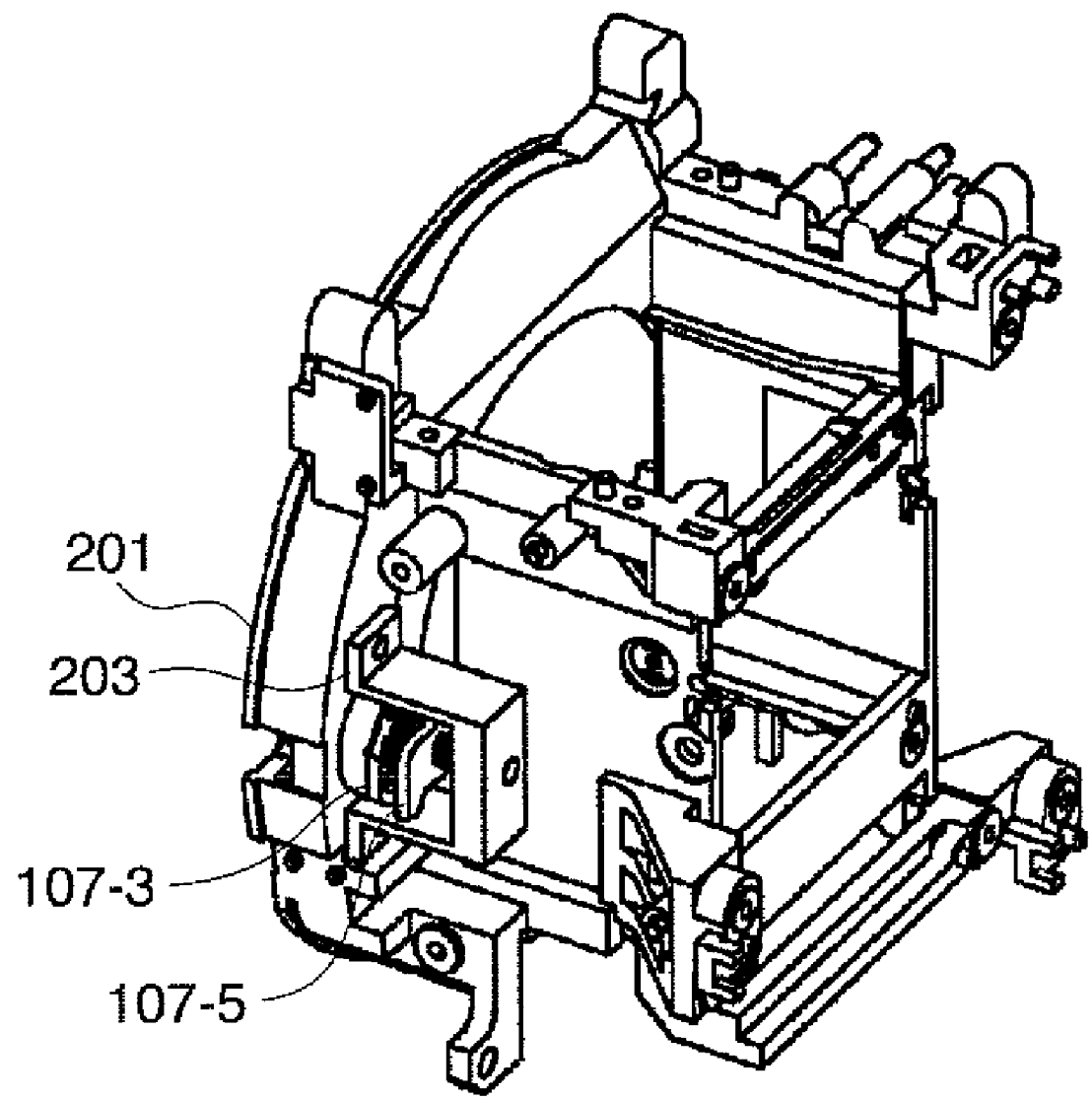
FIG. 15 is a perspective view of a mirror box, as viewed from the photographer side.

FIG. 15 is a perspective view of the mirror box 201, as viewed from the photographer side. A mechanism operated in a manner interlocked with an operation for mounting/removing the photographic lens unit A16 to/from the camera body-side bayonet lugs 105-*a* is fixed to the mirror box 201 by securing a cam base plate 203 to the mirror box 201 with screws, not shown.

Figure 16:
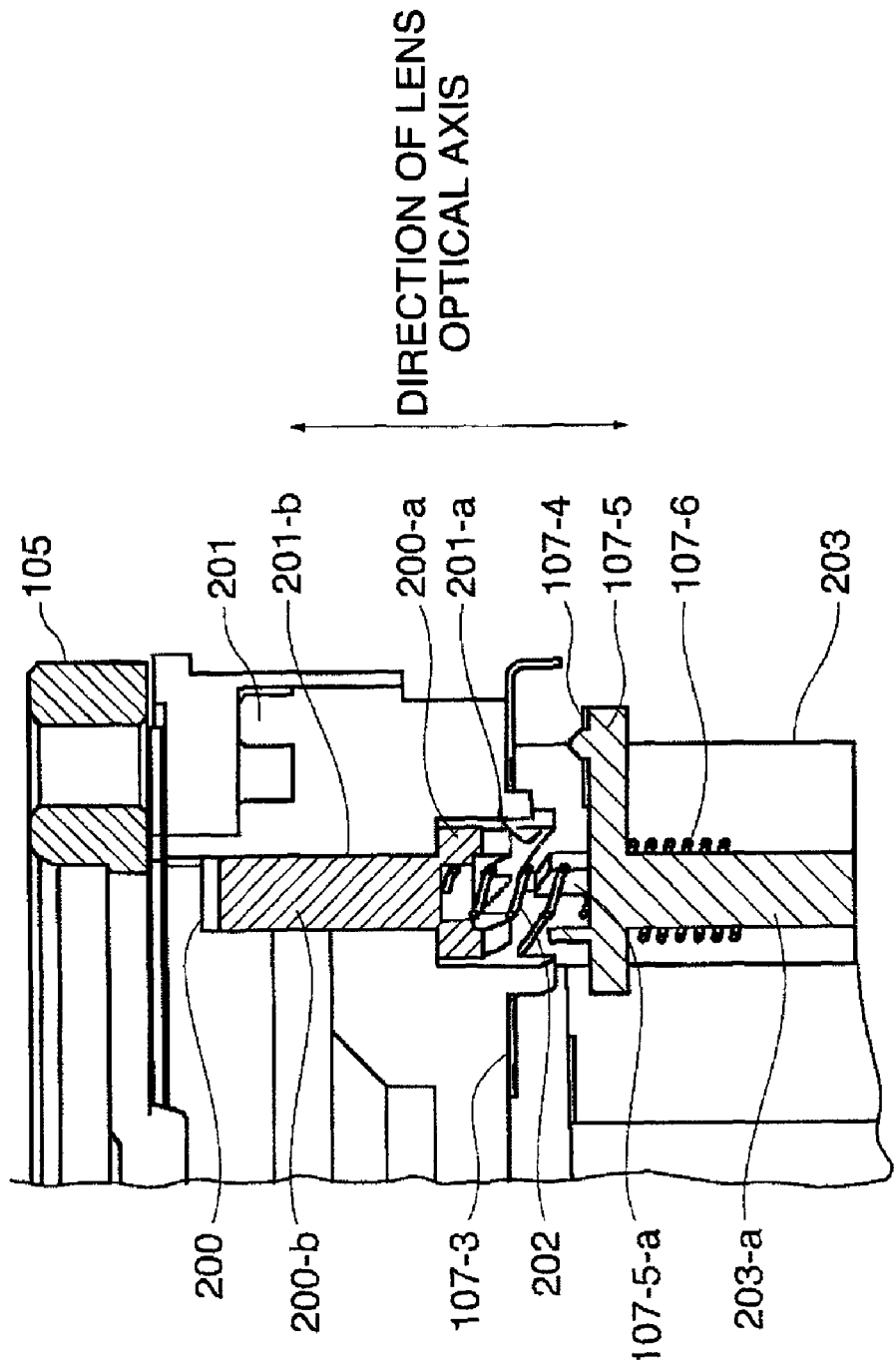
FIG. 16 is a cross-sectional view of the mirror box with the lens mount rigidly secured thereto.

The lens mount 105 is rigidly secured to the mirror box 201, as shown in FIG. 16, such that the photographic lens unit A16 can be removably mounted to the lens mount 105. The mirror box 201 has a through hole 201-*b* formed therethrough, and a fitting shaft 200-*b* of the linkage pin 200 is fitted through the through hole 201-*b* in a state restrained from rotation.

Further, the linkage pin 200 is integrally formed with a linkage cam 200-*a* having the same shape as the button cam 107-2-*a* in the first embodiment. A compression spring 202 for urging the linkage pin 200 toward the object side is disposed on an inner diameter side of the linkage cam 200-*a*. The photographer-side inner wall of the mirror box 201 is formed with a mirror box cam 201-*a* having the same shape as the cover cam 112-*a* in the first embodiment.

As a member for cam engagement with the linkage cam 200-*a* and the mirror box cam 201-*a*, there is provided the rotary cam member (rotary member) 107-5 as in the first embodiment. The rotary cam member 107-5 has the contact brush (movable unit) 107-4 and the compression spring 107-6 attached thereto. Further, the mirror box cam 201-*a* is surrounded by the phase flexible printed circuit board (position detecting unit) 107-3 having conductive traces for detecting the position of the contact brush 107-4.

The operation for detecting the position of the contact brush 107-4 by the phase flexible printed circuit board 107-3 as the rotary cam member 107-5 rotates is the same as that in the first embodiment, and therefore description thereof is omitted.

Next, a description will be given of the mechanism operated in a manner interlocked with the operation for mounting/removing the photographic lens unit A16 to/from the camera body-side bayonet lugs 105-*a*.

Figure 17:
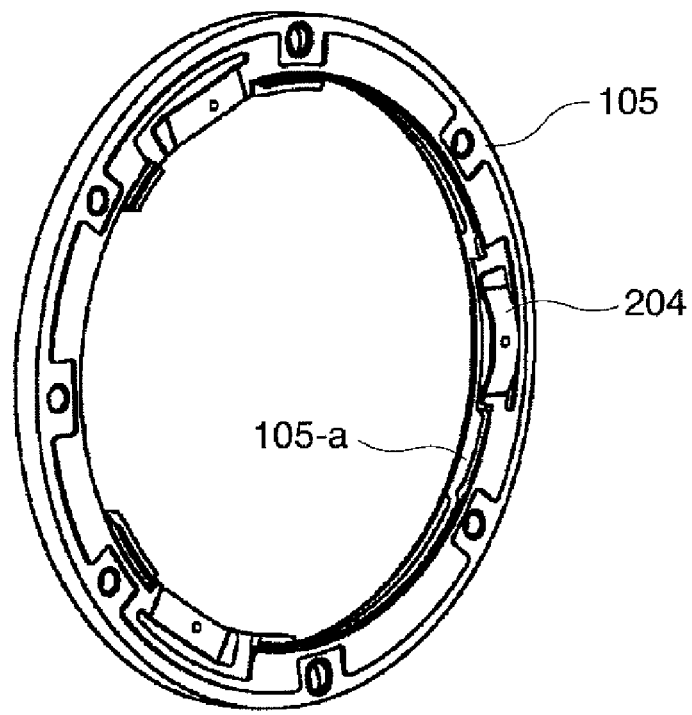
FIG. 17 is a perspective view of the lens mount.

As shown in FIG. 17, bayonet holding springs 204 are arranged on the photographer side of the lens mount 105. When the photographic lens unit A16 is mounted, each of the bayonet holding springs 204 gives an associated bayonet lug 105-*a* an urging force acting along the lens optical axis.

Figure 18:
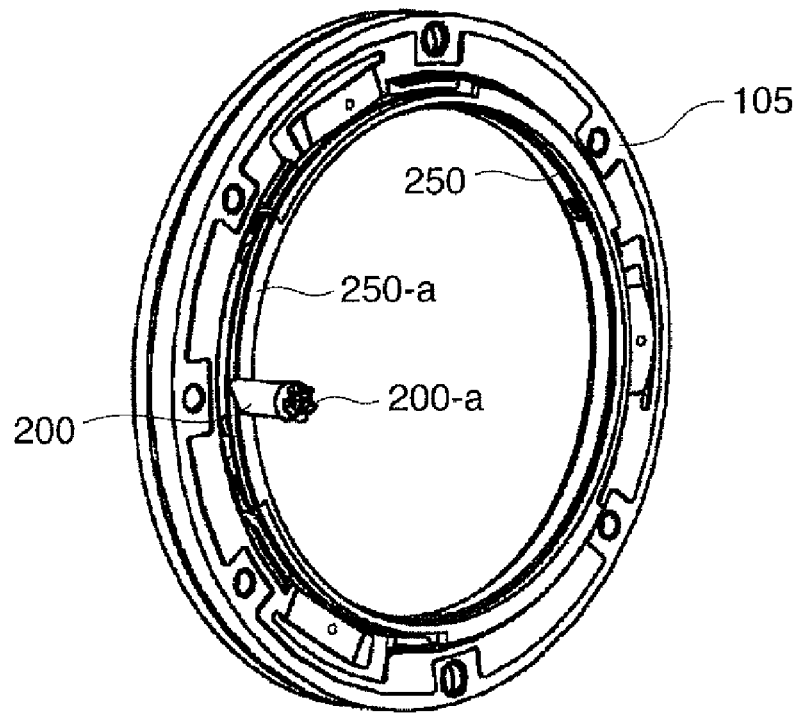
FIG. 18 is a perspective view of the lens mount in a state where a photographic lens mount of a photographic lens unit has been fitted therein.

FIG. 18 shows a photographic lens mount 250 of the photographic lens unit A16 in a state fitted in the lens mount 105. In FIG. 18, representation of the other parts of the photographic lens unit A16 than the photographic lens mount 250 is omitted. The photographic lens mount 250 has three lens-side bayonet lugs 250-*a* arranged at every 120° position.

When the photographic lens mount 250 is fitted in the lens mount 105, the lens-side bayonet lugs 250-*a* are mounted at a predetermined phase where interference with the camera body-side bayonet lugs 105-*a* is avoided. At this time, the linkage pin 200 is pushed by the photographer-side end face of one of the lens-side bayonet lugs 250-*a* and is moved toward the photographer side to be inserted into the mirror box 201. This operation corresponds to the depression of the unlock button 107 in the first embodiment.

Figure 19:
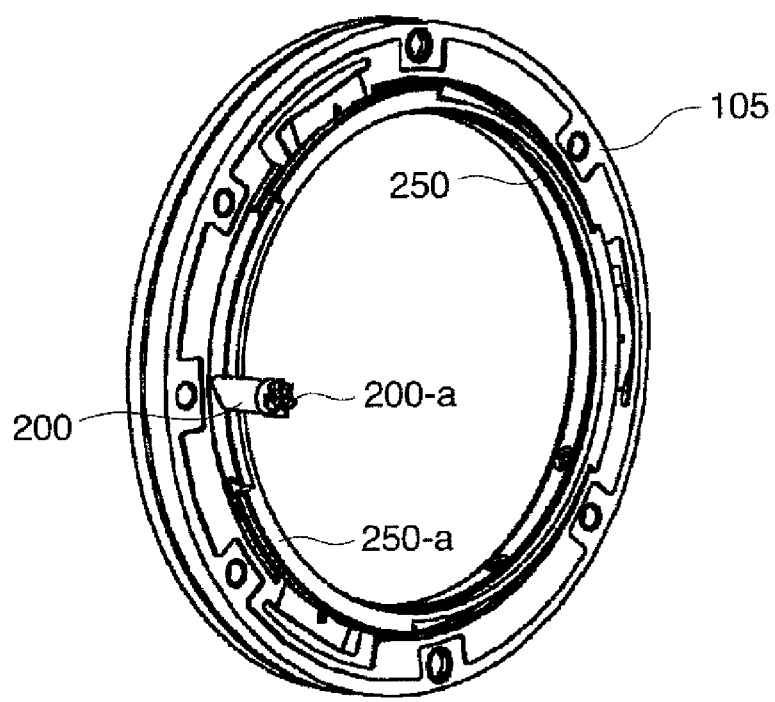
FIG. 19 is a perspective view of the lens mount in a state where the photographic lens mount has been rotated to a predetermined phase from the state shown in FIG. 18.

FIG. 19 shows a state of the lens mount 105 in which the photographic lens unit A16 has been rotated through 60° to a predetermined phase after fitting the photographic lens mount 250 of the photographic lens unit A16 therein. In this state, the camera body-side bayonet lugs 105-*a* and the lens-side bayonet lugs 250-*a* are held in a state urged against each other by the respective bayonet holding springs 204. The rotation of the photographic lens unit A16 brings the area where the linkage pin 200 is provided to an area outside the lens-side bayonet lugs 250-*a*. Therefore, the linkage pin 200 is shifted to the object-side position by the urging force of the compression spring 202 and is held in a state projected from the end face of the mirror box 201.

Next, the above-mentioned operation will be described in detail with reference to FIGS. 20 to 23.

Figure 20:
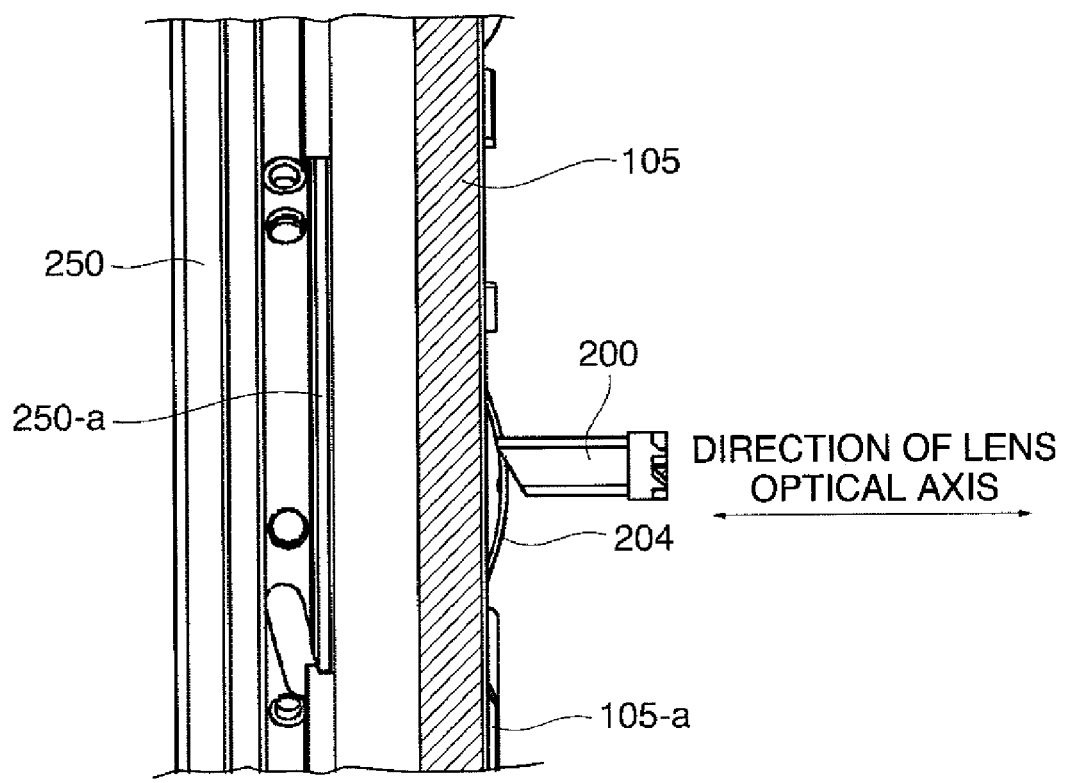
FIG. 20 is a view of a portion of the lens mount in a state where the photographic lens unit is being mounted therein.

FIG. 20 shows a state of a portion of the lens mount 105 in which the photographic lens unit A16 is being mounted therein. At this time, the linkage pin 200 is in a state projected from the end face of the mirror box 201.

Figure 21:
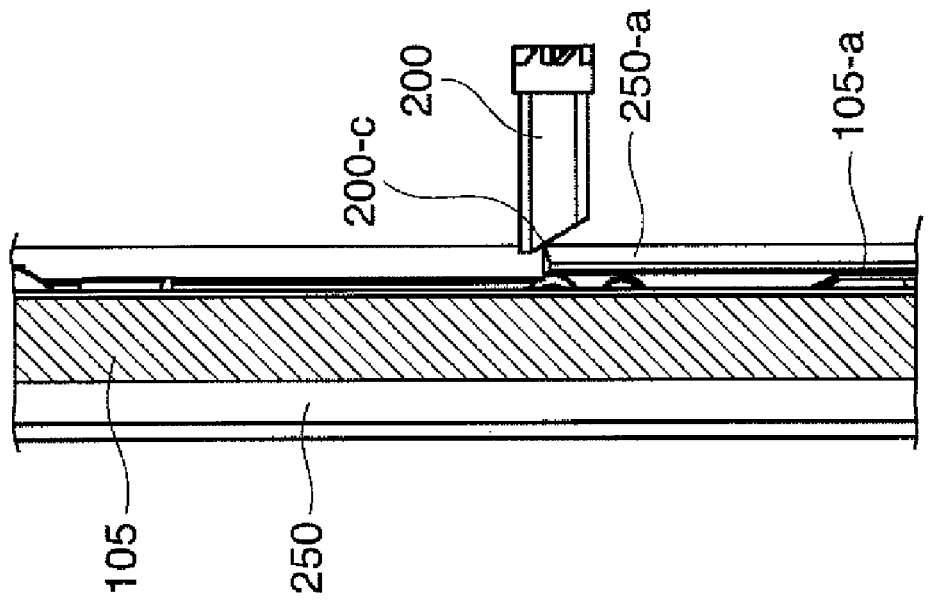
FIG. 21 is a view of a portion of the lens mount in a state where the photographic lens unit has been pushed therein at a predetermined phase when the photographic lens unit is mounted.

FIG. 21 shows a state of a portion of the lens mount 105 in which the photographic lens unit A16 has been pushed therein at the predetermined phase when mounting the photographic lens unit A16 thereto. At this time, the linkage pin 200 has been shifted to the photographer-side position by being pushed by the end face of the associated lens-side bayonet lug 250-*a*.

Figure 22:
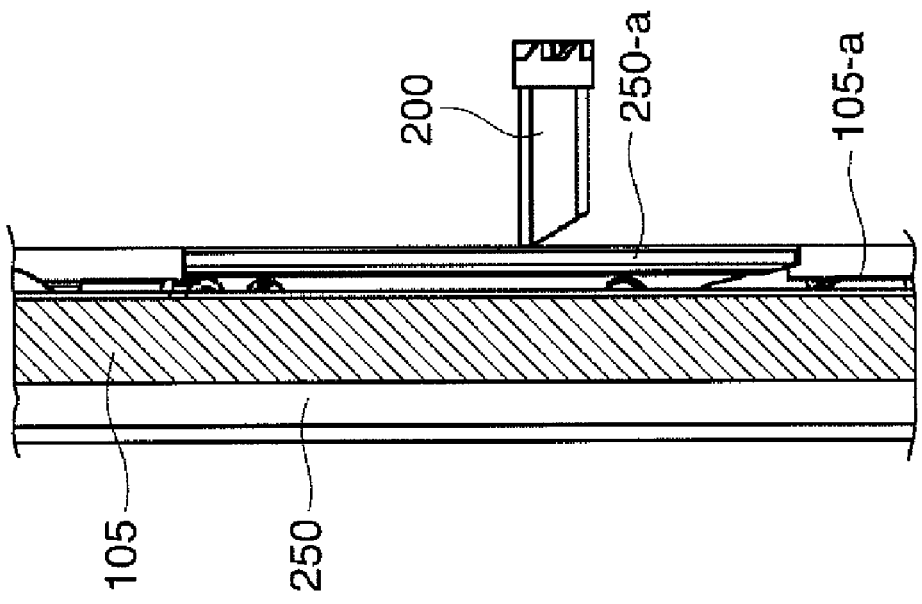
FIG. 22 is a view of a portion of the lens mount in a state where the photographic lens unit is being rotated to the predetermined phase.

FIG. 22 shows a state of a portion of the lens mount in which the photographic lens unit A16 is being rotated to the predetermined phase, and in the illustrated state, the photographic lens unit A16 has been rotated through approximately 30°. In FIG. 22, the lens-side bayonet lug 250-*a* is moved downward, as viewed in FIG. 22, but in actuality, it is rotated about the lens optical axis. Further, the lens-side bayonet lug 250-*a* has started to disengage from a tapered part 200-*c* formed on the linkage pin 200, i.e. the linkage pin 200 has started to be moved toward the object side by the urging force of the compression spring 202 and the tapered part 200-c.

Figure 23:
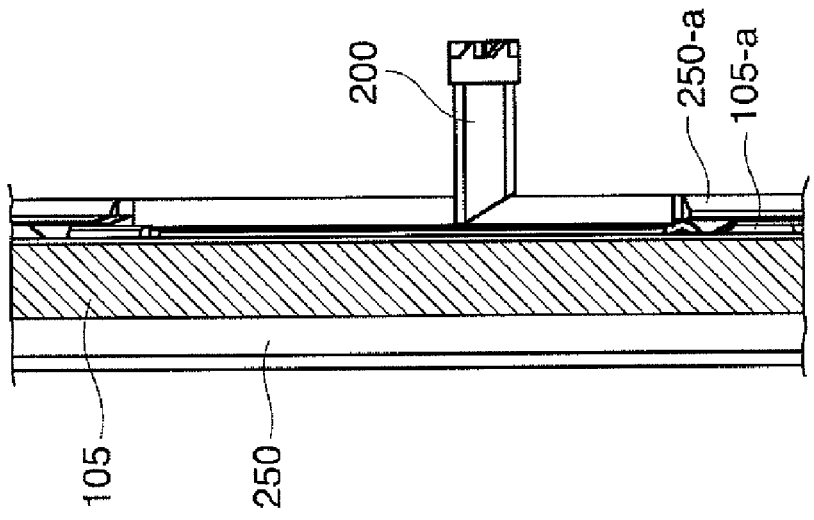
FIG. 23 is a view of a portion of lens in a state where the photographic lens unit has been fully rotated to the predetermined phase and completely mounted.

FIG. 23 shows a state of a portion of the lens mount 105 in which the photographic lens unit A16 has been fully rotated to the predetermined phase and is completely mounted to the camera body 100. In this state, the linkage pin 200 has been shifted to its initial position and held there. It should be noted that an operation for removing the photographic lens unit A16 is just the reverse of the operation for mounting the same, and hence description thereof is omitted.

The above-described sequential operation corresponds to the operation of depressing and releasing the unlock button 107 in the first embodiment. In the operation, the mirror box cam 201-a, the linkage cam 107-5-a, and the rotary cam 107-5-a are brought into contact with each other to thereby rotate the rotary cam member 107-5 and the contact brush 107-4.

Then, the rotation of the contact brush 107-4 changes one phase signal detected by the phase flexible printed circuit board 107-3 to another, as in the above-described first embodiment, which makes it possible to determine whether or not the photographic lens unit A16 was mounted/removed. Although in the present embodiment, the operation for mounting the photographic lens unit is described, the present embodiment can be applied to an operation for mounting a lens mount cap to be mounted on the lens mount 105 when the camera is not used.

As described above, according to the present embodiment, when the position information on the contact brush 107-4 operated in a manner interlocked with the operation for mounting/removing the photographic lens unit A16 to/from the bayonet lugs 105-a differs immediately after execution of a power-on operation from that obtained immediately after execution of a power-off operation, it is judged that photographic lens mounting/removing operation was carried out during the power-off state, and warning is executed to advise cleaning of the optical member A13.

As a consequence, even if a photographic lens mounting/removing operation is carried out in the power-off state or with the battery removed from the camera, resulting in attachment of dust to the optical member A13, since the above-mentioned warning is given, the dust can be cleaned off the optical member A13 before shooting is performed. Thus, it is possible to avoid picking up the image of the dust to thereby prevent degradation of image quality. It should be noted that even in the power-on state, whether or not a photographic lens mounting/removing operation was carried out may be determined by comparing the items of position information on the contact brush 107-4 operated in a manner interlocked with the operation for mounting/removing the photographic lens unit A16 to/from the bayonet lugs 105-a.

Figure 24:
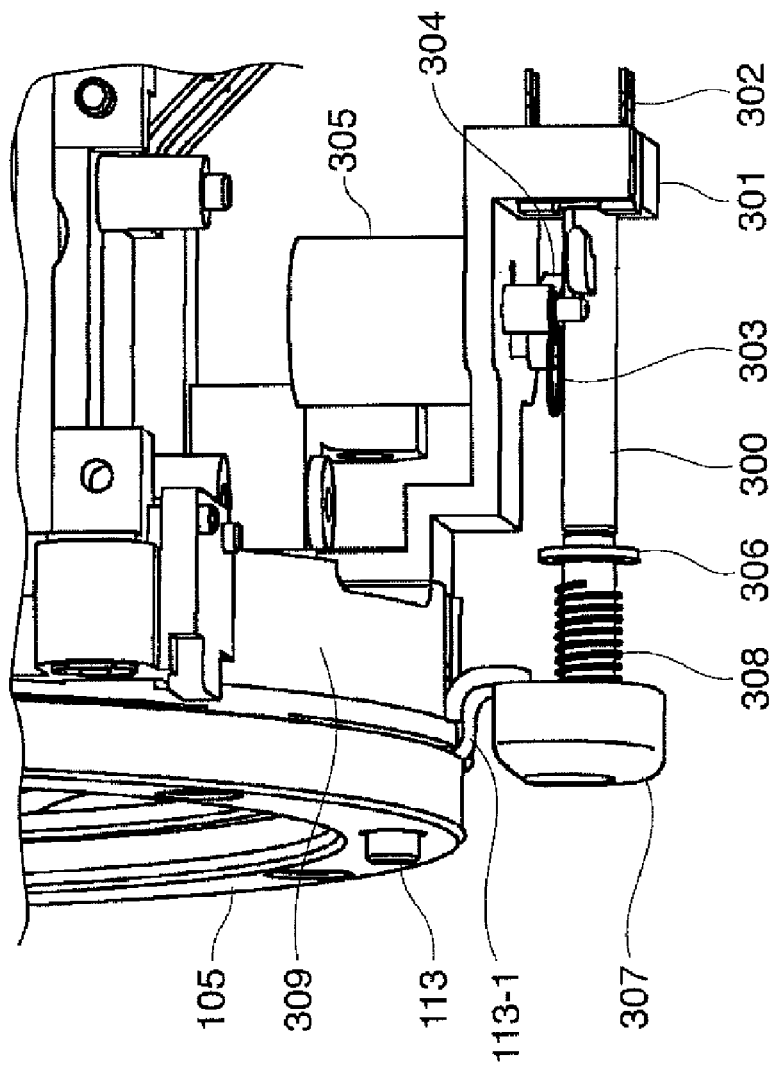
FIG. 24 is a perspective view of an unlock button and its surrounding of a digital single-lens reflex camera according to a third embodiment of the present invention.

Next, a digital single-lens reflex camera according to a third embodiment of the present invention will be described with reference to FIGS. 24 to 30. FIG. 24 is a perspective view of an unlock button and its surrounding of the digital single-lens reflex camera according to the third embodiment. In FIG. 24, a front cover is omitted from illustration. Component parts and elements identical to those of the first embodiment are designated by identical reference numerals, and description thereof is omitted.

As shown in FIG. 24, the unlock button (unlocking member) 307 is held in a state urged toward the object side, by a fall-off prevention mechanism using a front cover (not shown) and an E ring 306 and the urging force of a compression spring 308.

Figure 25:
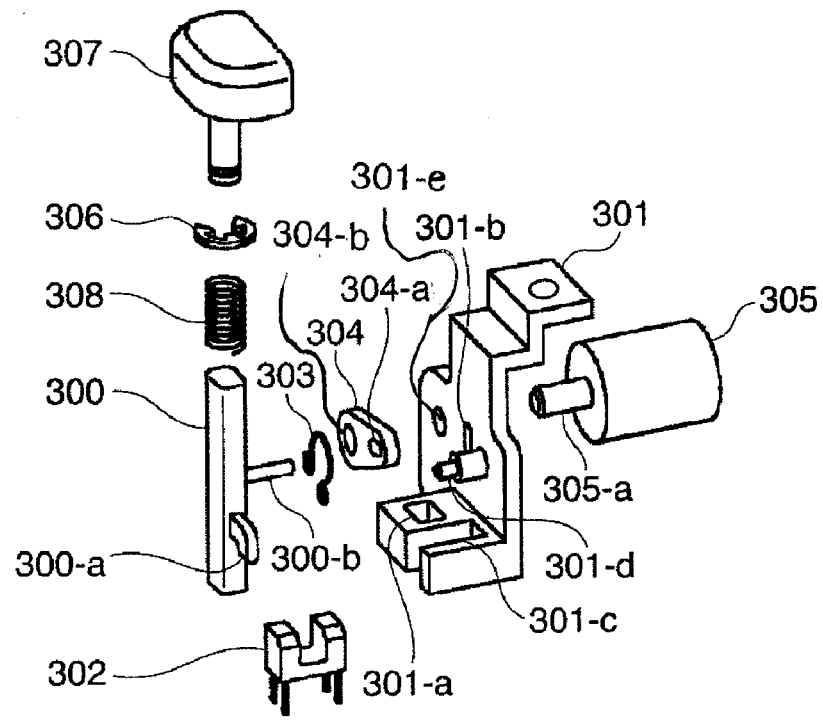
FIG. 25 is an exploded perspective view of a mechanism operated in a manner interlocked with the operation of the unlock button.

FIG. 25 is an exploded perspective view of a mechanism operated in a manner interlocked with an operation of the unlock button 307. Disposed on the photographer side of the unlock button 307 is a linkage lever 300 that can move along the lens optical axis in accordance with movement of the unlock button 307 along the lens optical axis. The linkage lever 300 has portions, referred to hereinafter, thereof fitted in fitting holes 301-a and 301-b formed in a lever base plate 301 whereby it is held in a state movable along the lens optical axis and restrained from rotation.

The linkage lever 300 is formed with a detected arm (movable unit) 300-a that moves in and out of a detector part of a photointerrupter 302 (hereinafter referred to as "the PI 302") attached to the lever base plate 301. Further, the linkage lever 300 is formed with a lever dowel 300-b for fixing one end of a toggle spring 303 for urging the linkage lever 300 toward the object side or the photographer side.

The lever base plate 301 is formed with a base plate dowel 301-d for fixing the other end of the toggle spring 303, an PI mounting part 301-c for mounting the PI 302, and a slot 301-b for preventing rotation of the linkage lever 300. The lever dowel 300-b is fitted through the slot (fitting hole) 301-b. The lever base plate 301 is rigidly secured to a mirror box 309 with screws, not shown, in a state holding the mechanism operated in a manner interlocked with the operation of the unlock button 307.

Further, a motor (drive unit) 305 is mounted to the lever base plate 301 such that its rotating shaft 305-a extends through a through hole 301-e formed in the lever base plate 301 and projects toward the linkage lever 300. The linkage lever 300 is driven by the motor 305 to move along the lens optical axis. A drive arm 304 attached to the rotating shaft 305-a of the motor 305 by having the rotating shaft 305-a fixedly fitted through a mounting hole 304-b thereof is formed with a slot 304-a for fitting on the lever dowel 300-b protruding from the linkage lever 300. This slot 304-a allows the linkage lever 300 to move along the lens optical axis. Although in the present embodiment, the linkage lever is driven by the rotary motor to move along the lens optical axis, a different type of drive unit, such as a solenoid, may be used to move the linkage lever.

Figure 26:
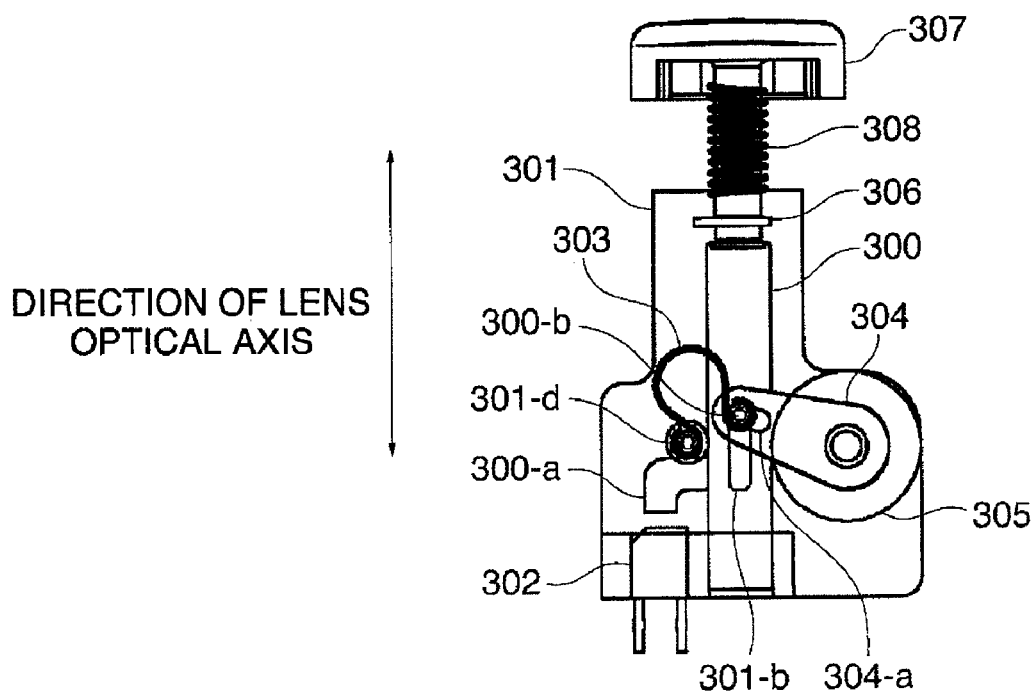
FIG. 26 is a see-through view useful in explaining the internal construction of the mechanism operated in a manner interlocked with the operation of the unlock button.

FIG. 26 is a see-through view (in which the front cover is not shown) showing the internal construction of the mechanism operated in a manner interlocked with the operation of the unlock button 307.

As shown in FIG. 26, the unlock button 307 is urged toward the object side by the compression spring 308 and is held in a predetermined position. The toggle spring 303 generates an urging force acting in a direction for moving the lever dowel 300-b away from the base plate dowel 301-d, to thereby urge the linkage lever 300 toward the object side. The linkage lever 300 is held in contact with the photographer-side end of the unlock button 307 by the urging force of the toggle spring 303. At this time, the detected arm 300-a is in a position where it has moved out from the detector part of the PI 302. The motor 305 is in a deenergized state.

Figure 27:
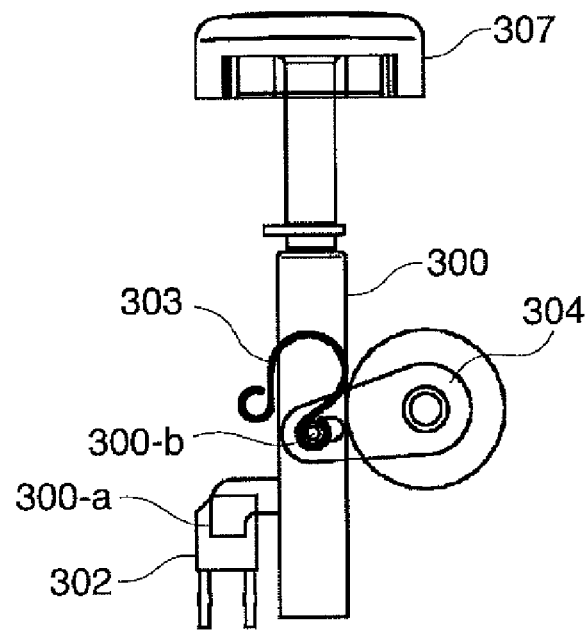
FIG. 27 is a view of the unlock button in an operated state.

FIG. 27 shows the unlock button 307 in a depressed state. In FIG. 27, the lever base plate 301 and the compression spring 308 are omitted from illustration.

As shown in FIG. 27, when the unlock button 307 is depressed toward the photographer side, the end of the unlock button 307 pushes the linkage lever 300 toward the photographer side, and therefore the linkage lever 300 is also moved toward the photographer side. The lever dowel 300-b and the base plate dowel 301-d are positioned such that the turning point of the toggle spring 303 corresponds to approximately half the amount of depression of the unlock button 307. With this arrangement, when depression of the unlock button 307 is completed, the direction in which the toggle spring 303 urges the linkage lever 300 is reversed, whereby the linkage lever 300 can be changed into a state urged toward the photographer side.

In the state where the linkage lever 300 is urged toward the photographer side, the detected arm 300-a is in a position inserted in the detector part of the PI 302. Although in the present embodiment, the PI is employed as a position detecting unit, this is not limitative, but it is possible to employ any suitable detector element having a movable part that operates in a manner interlocked with the detected arm.

Figure 28:
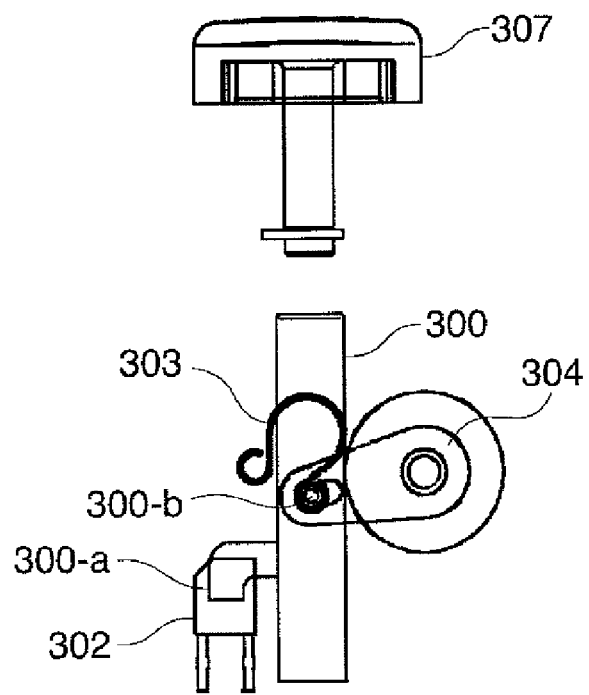
FIG. 28 is a view of the unlock button in a state released after depression.

FIG. 28 shows a state where the unlock button 307 has been released after depression. In this state, the unlock button 307 is urged and moved toward the object side by the compression spring 308 and is held in a predetermined position by abutment of the E ring 306 with the front cover.

On the other hand, the linkage lever 300 is held in a state shifted to the photographer-side position by the urging force of the toggle spring 303 acting in the direction toward the photographer side. More specifically, once the unlock button 307 is operated so as to remove the photographic lens unit, the linkage lever 300 is held in the state shifted to the photographer-side position. In the state where the linkage lever 300 is urged toward the photographer side, the detected arm 300-a is in a position inserted in the detector part of the PI 302.

Therefore, based on whether or not the detected arm 300-a is detected by the PI 302, it is possible to determine whether or not the unlock button 307 was operated, i.e. whether or not an operation for mounting/removing the photographic lens unit C16 (see FIG. 29) was carried out.

Figure 29:
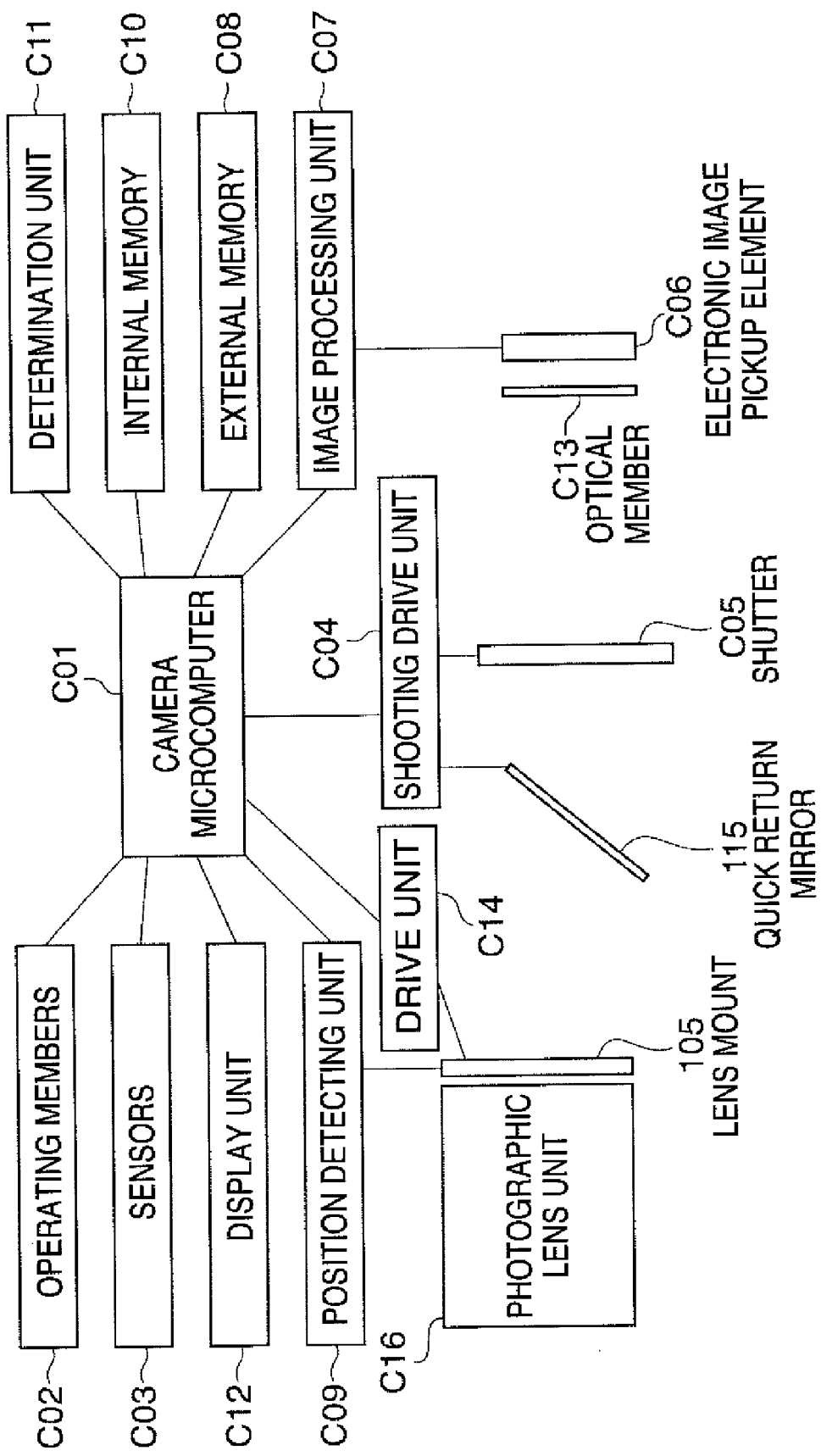
FIG. 29 is a control block diagram of the digital single-lens reflex camera according to the third embodiment.
Figure 30:
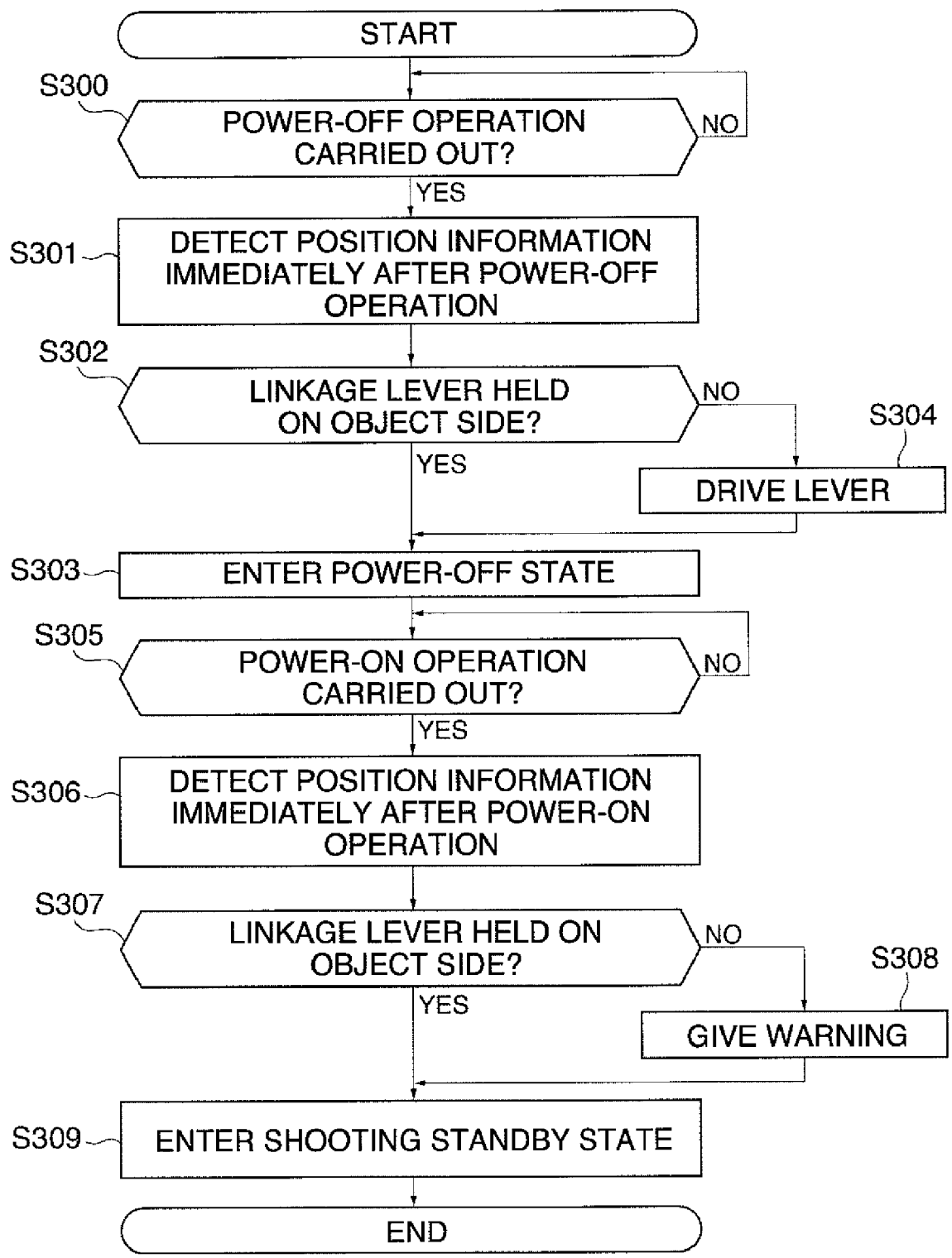
FIG. 30 is a flowchart useful in explaining an example of operation of the digital single-lens reflex camera according to the third embodiment.

FIG. 29 is a control block diagram of the digital single-lens reflex camera according to the third embodiment. FIG. 30 is a flowchart useful in explaining an example of operation of the digital single-lens reflex camera according to the third embodiment.

The process shown FIG. 30 will be described while referring to FIG. 29. When a power-off operation is carried out in a step S300 in FIG. 30, the process proceeds to a step S301.

In the step S301, a camera microcomputer C01 drives the PI 302 as a position detecting unit C09 to detect whether or not the detected arm 300-a of the linkage lever 300 is engaged in the PI 302, and obtains position information on the linkage lever 300 as a result of the detection, i.e. obtains position information on the linkage lever 300 concerning whether it is held on the object side or on the photographer side. Although in the present embodiment, it is detected after execution of the power-off operation whether or not the detected arm 300-a is inserted in the PI 302, this is not limitative, but whether or not the detected arm 300-a is inserted in the PI 302 may be periodically detected and use the position information on the detected arm 300-a obtained immediately before turn-off of the power.

In a step S302, it is determined, based on the position information obtained in the step S301, whether or not the linkage lever 300 is held on the object side. If it is determined that the linkage lever 300 is held on the object side, the process proceeds to a step S303, wherein the camera enters the power-off state. On the other hand, if it is determined that the linkage lever 300 is held on the photographer side, the process proceeds to a step S304.

In the step S304, the camera microcomputer C01 drives the motor 305 as a drive unit C14 to shift the linkage lever 300 to the object-side position. When the linkage lever 300 is shifted to the object-side position, the detected arm 300-a is moved out of the PI 302. In response thereto, the camera microcomputer C01 stops driving the motor 305, based on a change in a signal from the PI 302, and the process proceeds to the step S303, wherein the camera enters the power-off state. In short, after execution of the power-off operation, the linkage lever 300 is caused to be always in a state shifted to the object-side position. Even in the power-off state, the linkage lever 300 is constantly held on the object side by the urging force of the toggle spring 303.

When the power is turned off by the operation of the power switch member 102, the system stops and never performs an operation until an power-on operation is carried out using the power switch member 102, even if any other operation member A02 is operated (step S305). Insofar as the operation of the release button 104 for returning the camera from the sleep state to the ON state is concerned, it may be checked by interrupt handling in the step S305 whether or not the release button 104 was operated.

If it is determined in the step S305 that power-on operation has been carried out, the power is turned on to activate the system, and the process proceeds to a step S306.

In the step S306, immediately after execution of the power-on operation, the camera microcomputer C01 drives the PI 302 as the position detecting unit C09 to detect whether or not the detected arm 300-a of the linkage lever 300 is in the position inserted in the PI 302, and obtains position information on the linkage lever 300 as a result of the detection, i.e. obtains position information on the linkage lever 300 concerning whether it is held on the object side or on the photographer side.

Then, in a step S307, it is determined, based on the position information obtained in the step S306, whether or not the linkage lever 300 is held on the object side. If it is determined that the linkage lever 300 is held on the object side, a determination unit C11 judges that a photographic lens mounting/removing operation was not carried out, and the process proceeds to a step S309, wherein the camera enters the shooting standby state. On the other hand, if it is determined in the step S307 that the linkage lever 300 is held on the photographer side, the determination unit C11 judges that a photographic lens mounting/removing operation was carried out, and the process proceeds to a step S308.

In the step S308, a warning signal advising cleaning of an optical member C13, such as an LPF, is output, and then the process proceeds to the step S309, wherein the camera enters the shooting standby state.

It is desired that cleaning of the optical member C13 is advised e.g. by causing the camera microcomputer (processing unit) C01 to display a message, such as "An image of dust can be picked up" or "Cleaning of the low-pass filter is recommended", on a display unit C12 (e.g. a liquid crystal display for monitoring picked-up images). Alternatively, an alarm advising cleaning of the optical member C13 may be given using sound.

As described above, according to the present embodiment, when the position information on the linkage lever 300, i.e. the detected arm 300-a that moves in a manner interlocked with the operation of the unlock button 307 differs immediately after execution of a power-on operation from that obtained immediately after execution of a power-off operation, it is judged that a photographic lens mounting/removing operation was carried out during the power-off state, and warning is executed to advise cleaning of the optical member C13.

As a consequence, even if a photographic lens mounting/removing operation is carried out in the power-off state or with the battery removed from the camera, resulting in attachment of dust to the optical member C13, since the above-mentioned warning is given, the dust can be cleaned off the optical member C13 before shooting is performed. This makes it possible to avoid picking up the image of the dust to thereby prevent degradation of image quality. It should be noted that even in the power-on state, whether or not photographic lens mounting/removing operation was carried out may be determined by comparing the items of position information on the detected arm 300-a that moves in a manner interlocked with the operation of the unlock button 307.

Figure 31:
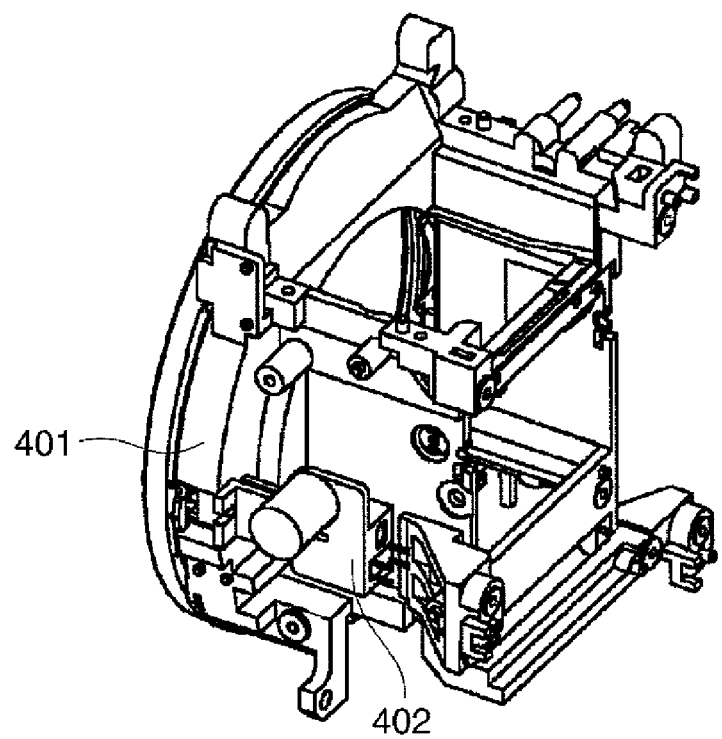
FIG. 31 is a perspective view of an unlock button and its surrounding of a digital single-lens reflex camera according to a fourth embodiment of the present invention.
Figure 32:
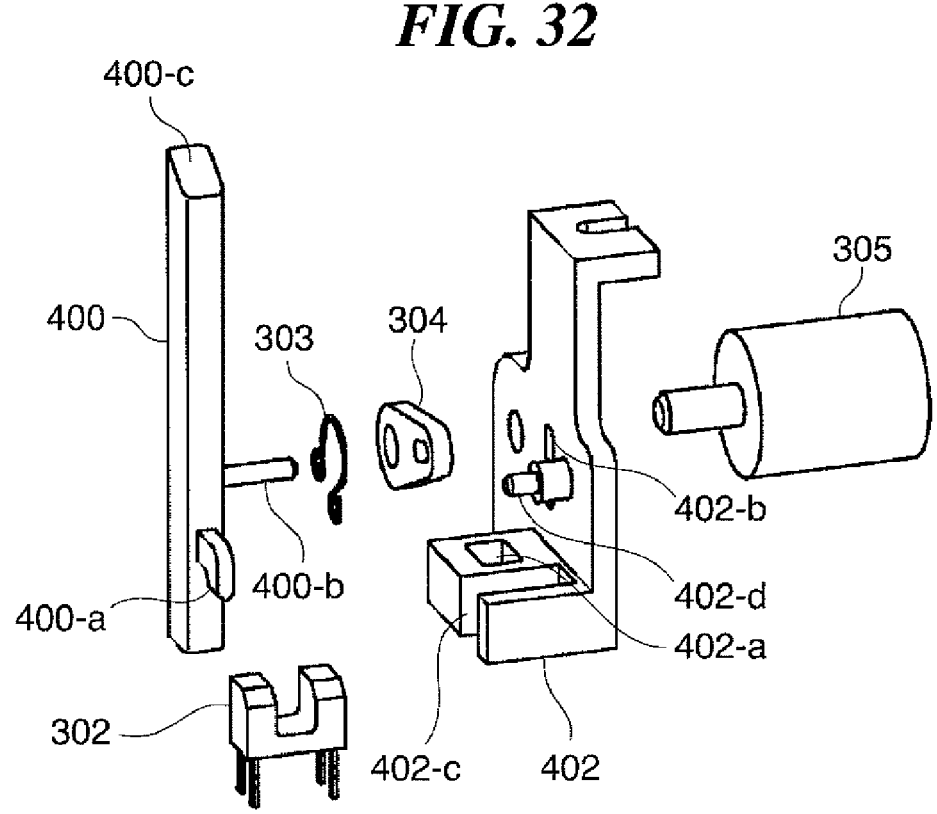
FIG. 32 is an exploded perspective view useful in explaining a mechanism operated in a manner interlocked with a bayonet engagement operation.

Next, a digital single-lens reflex camera according to a fourth embodiment of the present invention will be described with reference to FIGS. 31 to 33. FIG. 31 is a perspective view of an unlock button and its surrounding of the digital single-lens reflex camera according to the fourth embodiment. FIG. 32 is an exploded perspective view of a mechanism operated in a manner interlocked with a bayonet engagement operation (photographic lens unit mounting/removing operation).

The present embodiment is distinguished from the above-described third embodiment in which determination as to a photographic lens mounting/removing operation is performed by comparing items of position information on the detected arm 300-a that moves in a manner interlocked with the operation of the unlock button 307, only in that the determination is performed by comparing items of position information of a detected arm 400-a that moves in a manner interlocked with a bayonet engagement operation (see the second embodiment). The mechanism operated in a manner interlocked with bayonet engagement operation is substantially the same as the mechanism operated in a manner interlocked with the operation of the unlock button 307. Therefore, component parts and elements identical to those of the third embodiment are designated by identical reference numerals, and description thereof is omitted.

As shown in FIGS. 31 and 32, in the digital single-lens reflex camera according to the fourth embodiment, a linkage lever 400 is disposed in a manner protruding from an end face of a mirror box 401, and has an end thereof formed as a tapered part 400-c. A motor base plate 402 (corresponding to the lever base plate 301 in the third embodiment) on which is mounted the motor 305 is rigidly secured to the mirror box 401 with screws, not shown.

The tapered part 400-c of the linkage lever 400 is identical in shape to the tapered part 200-c of the linkage lever 200. Further, a mechanism for moving the linkage lever 400 along the lens optical axis in a manner interlocked with a photographic lens mounting/removing operation is the same as the mechanism, described in the second embodiment, for moving the linkage pin 200 along the lens optical axis in a manner interlocked with the photographic lens mounting/removing operation.

The linkage lever 400 is formed with a detected arm (movable unit) 400-a for being inserted in the detector part of the PI 302, and a lever dowel 400-b for fixing one end of the toggle spring 303. The detected arm 400-a and the lever dowel 400-b are identical in shape to the detected arm 300-a and the lever dowel 300-b formed in the linkage lever 300 described in the third embodiment.

A motor base plate 402 is formed with a base plate dowel 402-d for fixing the other end of the toggle spring 303, a PI mounting part 402-c for mounting the PI 302 for detecting the position of the linkage lever 400, and a slot 402-b for preventing rotation of the linkage lever 400. The base plate dowel 402-d, the PI mounting part 402-c, and the slot 402-b are identical in shape to the base plate dowel 301-b, the PI mounting part 301-c, and the slot 301-b for preventing rotation, in the third embodiment.

Figure 33:
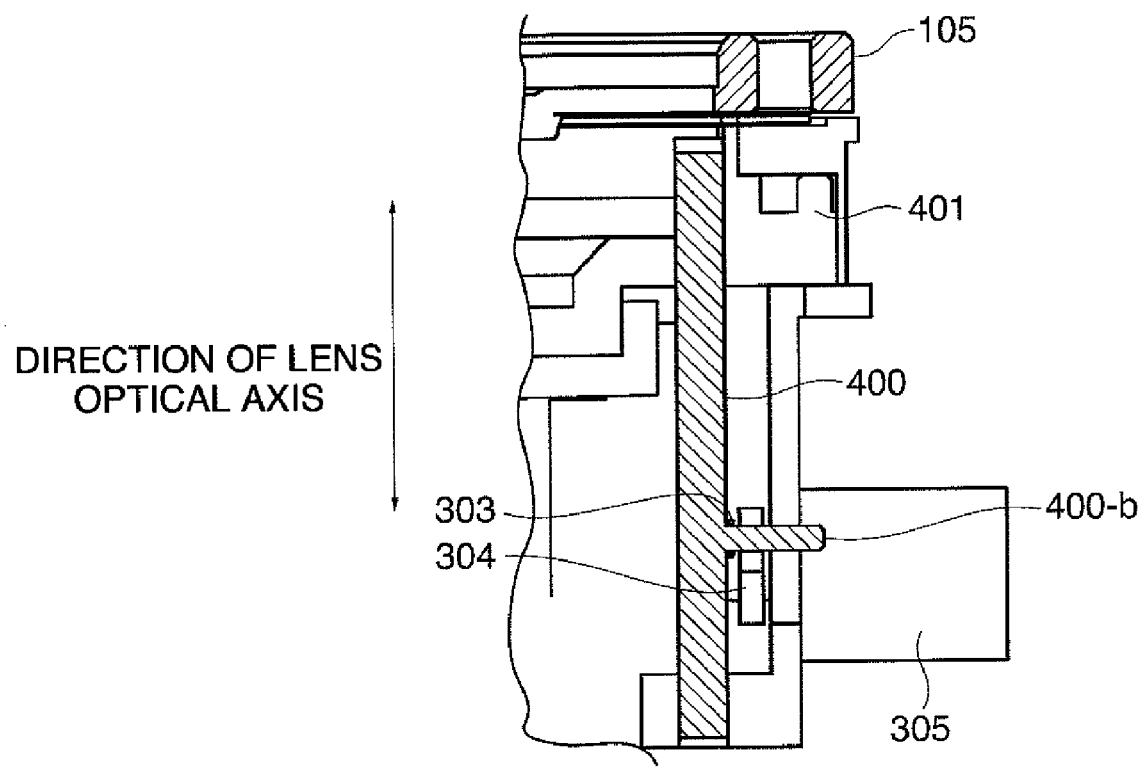
FIG. 33 is a cross-sectional view of a mirror box with a lens mount rigidly secured thereto.

FIG. 33 is a cross-sectional view of the mirror box 401 with the lens mount 105 rigidly secured thereto. The linkage lever 400 is held in the mirror box 401 in a manner movable along the lens optical axis and restrained from rotation. The linkage lever 400 is held in a state shifted to the object side or the photographer side by the urging force of the toggle spring 303.

An operation of pushing the linkage lever 400 toward the photographer side by the lens-side bayonet lugs is identical to the operation of pushing in the linkage pin 200 toward the photographer side by the lens-side bayonet lugs in the second embodiment, and hence description thereof is omitted. Further, a mechanism using the toggle spring 303 to hold the state where the linkage lever 400 is pushed toward the photographer side is identical to the mechanism in the third embodiment, which uses the toggle spring 303 to hold the state where the linkage lever 300 is pushed toward the photographer side, and hence description thereof is also omitted.

The basic operation of the present embodiment is the same as that of the third embodiment described with reference to FIG. 30, and therefore only the outline thereof will be described here. Control is performed such that the linkage lever 400 is always held in a state shifted to the object side immediately after execution of the power-off operation.

Then, if the linkage lever 400 is held on the object side immediately after execution of the power-on operation, it is determined that a photographic lens mounting/removing operation was not carried out. On the other hand, if the linkage lever 400 is held on the photographer side, it is determined that the photographic lens mounting/removing operation was carried out, and a warning is displayed on the display unit (e.g. a liquid crystal display for monitoring picked-up images) to advise cleaning of the optical member, such as an LPF.

As described above, according to the present embodiment, when the position information on the detected arm 400-a that moves in a manner interlocked with the photographic lens mounting/removing operation differs immediately after execution of a power-on operation from that obtained immediately after execution of a power-off operation, it is judged that the photographic lens mounting/removing operation was carried out during the power-off state, and warning is executed to advise cleaning of the optical member, such as an LPF.

As a consequence, even if the photographic lens mounting/removing operation is carried out in the power-off state or with the battery removed from the camera, resulting in attachment of dust to the optical member, such as an LPF, since the above-mentioned warning is given, the dust can be cleaned off the optical member before shooting is performed. This makes it possible to avoid picking up the image of the dust to thereby prevent degradation of image quality. It should be noted that even in the power-on state, whether or not a photographic lens mounting/removing operation was carried out may be determined by comparing items of position information on the detected arm 400-a that moves in a manner interlocked with the photographic lens mounting/removing operation.

Figure 34:
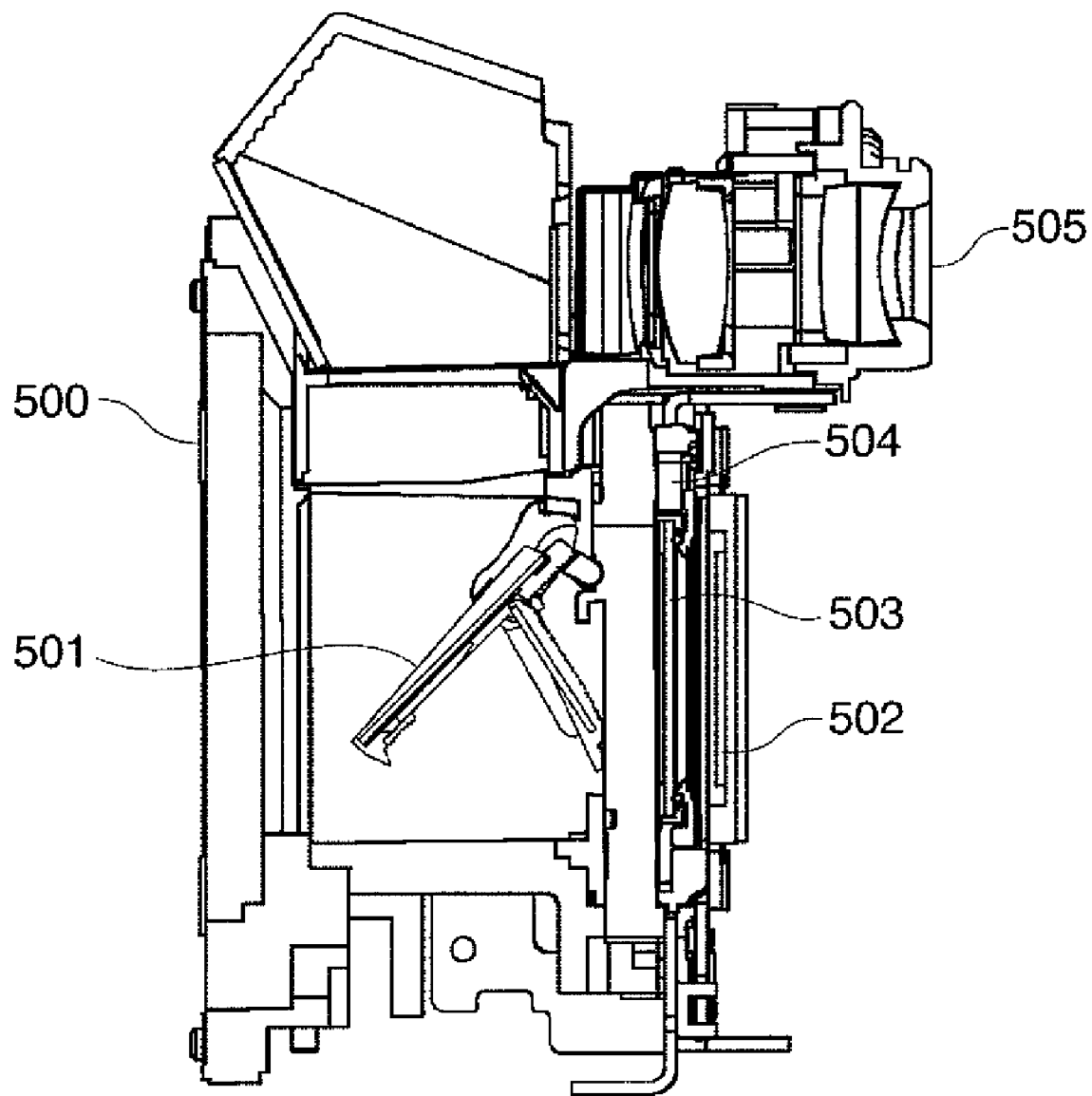
FIG. 34 is a cross-sectional view of essential parts of a digital single-lens reflex camera according to a fifth embodiment of the present invention.
Figure 35:
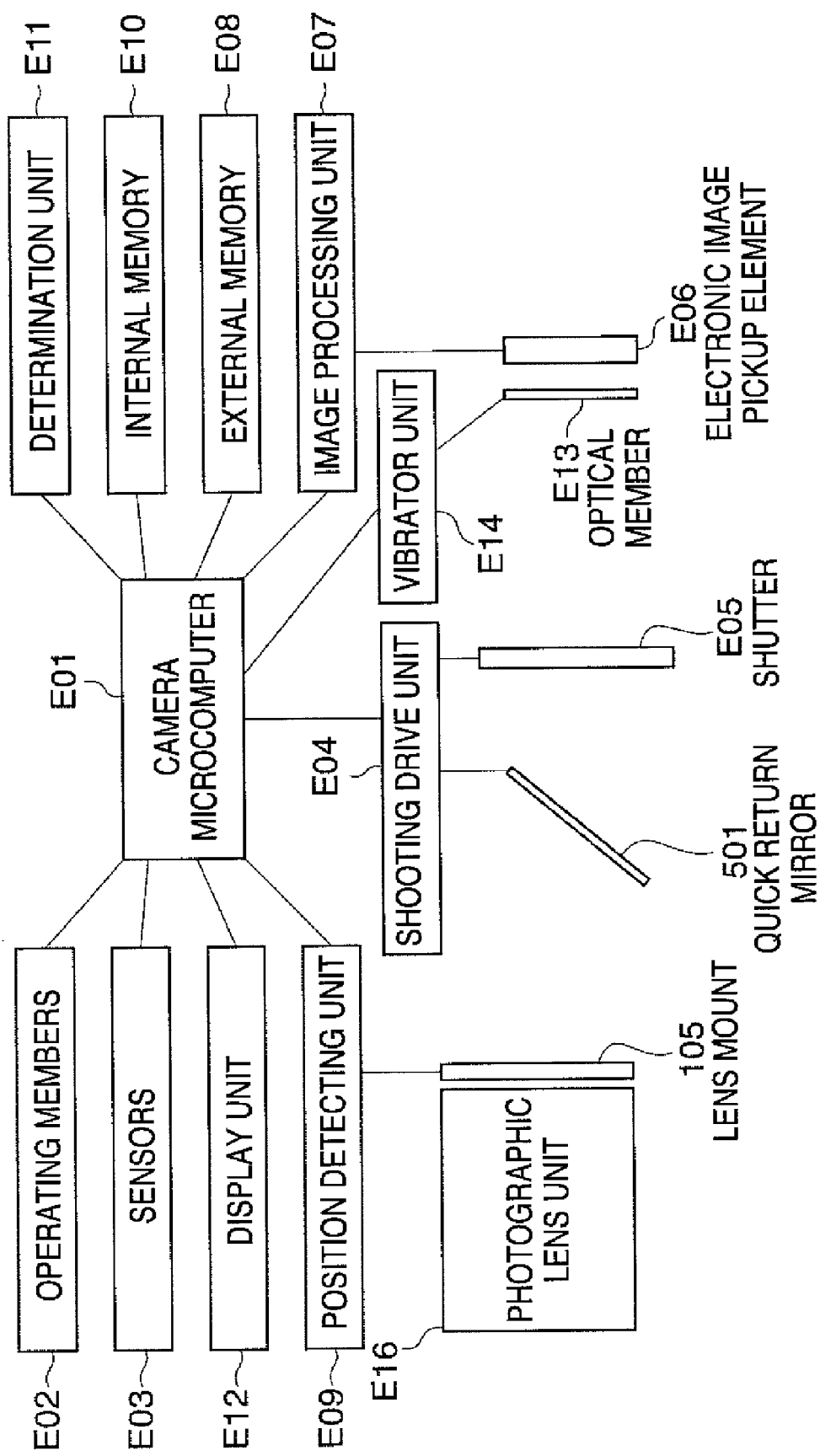
FIG. 35 is a control block diagram of the digital single-lens reflex camera according to the fifth embodiment.

Next, a digital single-lens reflex camera according to a fifth embodiment of the present invention will be described with reference to FIGS. 34 to 36. FIG. 34 is a cross-sectional view of essential parts of the digital single-lens reflex camera according to the fifth embodiment. The present embodiment is distinguished from the first embodiment only in that there is additionally provided a dust-removing unit for removing dust from an optical member, such as an LFP. Therefore, description overlapping that of the first embodiment is omitted.

As shown in FIG. 34, a mirror box 500 contains a quick return mirror 501. An LPF 503 (E13) as an optical member is disposed on the object side of an electronic image pickup element 502, and a piezoelectric element (vibrator unit) 504 for providing vibration to the LPF 503 is disposed between the LPF 503 and a finder optical system 505.

Control is performed such that the piezoelectric element 504 disposed in the vicinity of the LPF 503 is driven for vibration to cause resonance vibration in the LPF 503, whereby dust attached to the surface of the LFP 503 can be removed. As shown in FIG. 35, a shutter mechanism E05 is disposed between the LPF 503 and the quick return mirror 501. Although in the present embodiment, dust attached to the LFP 503 is removed by causing the piezoelectric element to provide vibration to the LFP 503, this is not limitative, but other methods (e.g. a wiping method) may be employed to remove dust.

Next, an example of operation of the digital single-lens reflex camera according to the fifth embodiment will be described with reference to FIGS. 35 and 36. FIG. 35 is a control block diagram of the digital single-lens reflex camera according to the fifth embodiment, and FIG. 36 is a flowchart useful in explaining the process of the digital single-lens reflex camera according to the fifth embodiment. Component parts and elements identical to those of the first embodiment are designated by identical reference numerals.

Figure 36:
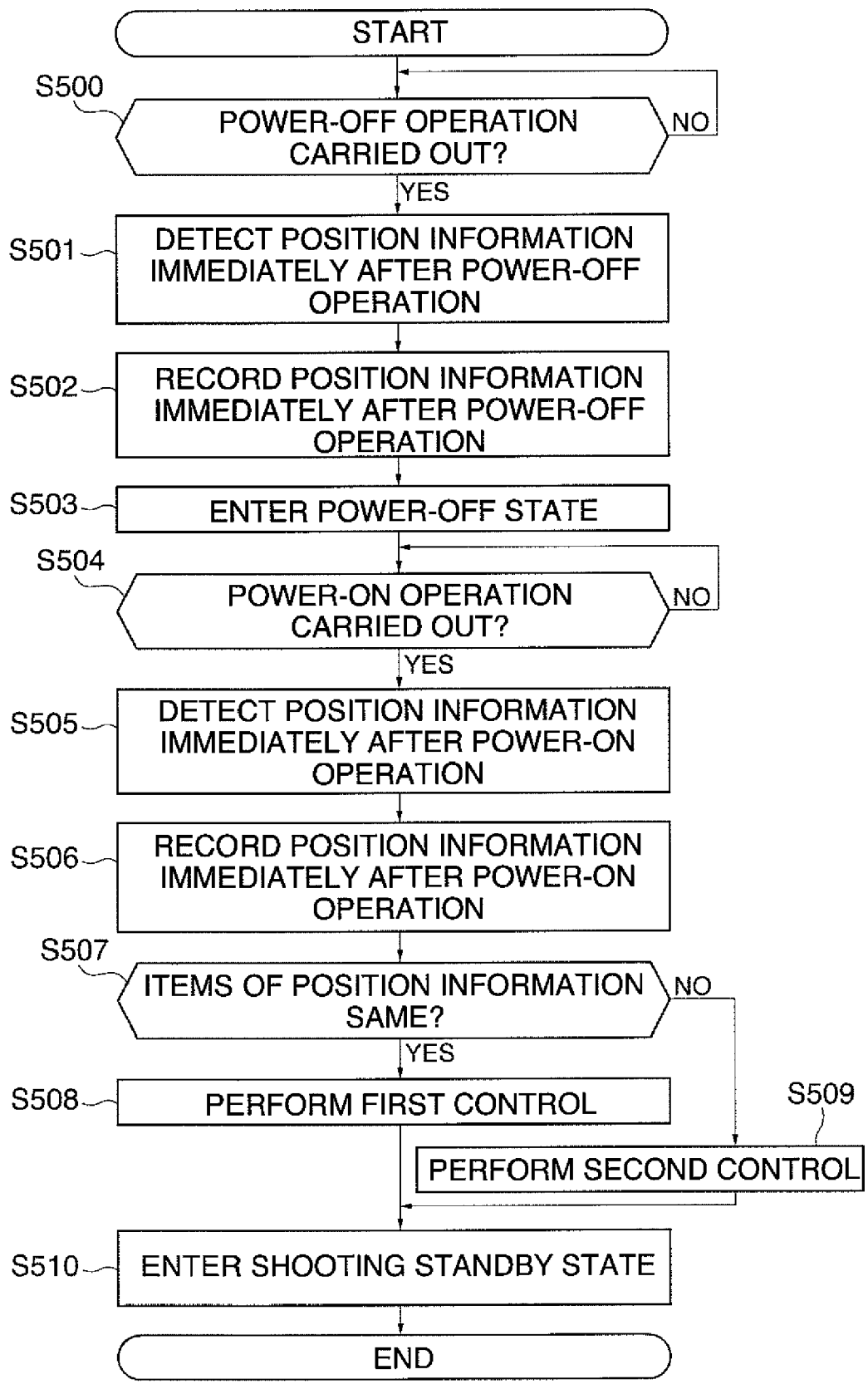
FIG. 36 is a flowchart useful in explaining an example of operation of the digital single-lens reflex camera according to the fifth embodiment.

First, when a power-off operation is carried out in a step S500 in FIG. 36, the process proceeds to a step S501. In the step S501, position information on the contact brush 107-4 is obtained as a result of detection of a position of the contact brush 107-4 immediately after execution of the power-off operation, by the phase flexible printed circuit board 107-3 as a position detecting unit E09.

Then, in a step S502, the position information detected by the phase flexible printed circuit board 107-3 immediately after execution of the power-off operation is recorded in an internal memory (storage unit) E10. Although in the present embodiment, the position information on the contact brush 107-4 is detected and recorded immediately after execution of the power-off operation, this is not limitative, but the position information on the contact brush 107-4 may be periodically detected to store an item of position information obtained immediately before power-off.

After the position information on the contact brush 107-4 is recorded in the internal memory E10 in the step S502, the process proceeds to a step S503, wherein the camera enters the power-off state.

When the power is turned off by operation of the power switch member 102, the system stops and never performs an operation until a power-on operation is carried out by the power switch member 102, even if any other operation member A02 is operated (step S504). Insofar as the operation of the release button 104 for returning the camera from the sleep state to the ON state is concerned, it may be checked by interrupt handling in the step S504 whether or not the release button 104 was operated.

If it is determined in the step S504 that the power-on operation has been carried out, the power is turned on to activate the system, and the process proceeds to a step S505.

In the step S505, position information on the contact brush 107-4 immediately after execution of the power-on operation is detected by the phase flexible printed circuit board 107-3 as the position detecting unit E09, and in a step S506, the position information detected by the phase flexible printed circuit board 107-3 is recorded in the internal memory (storage unit) E10.

After the position information on the contact brush 107-4 detected immediately after execution of the power-on operation is recorded in the internal memory E10, the process proceeds to a step S507, wherein a determination unit E11 performs a comparison between the item of position information detected immediately after execution of the power-off operation and the item of position information detected immediately after execution of the power-on operation, both of which have been stored in the internal memory E10. If the two items of position information are identical, it is judged that a photographic lens mounting/removing operation was not performed, and the process proceeds to a step S508. On the other hand, if the two items of position information are not identical, it is judged that a photographic lens mounting/removing operation was performed, and the process proceeds to a step S509.

In the step S508, a camera microcomputer (processing unit) E01 performs a first control to cause the piezoelectric element 504 as a vibrator unit E14 not to be driven, and then the process proceeds to a step S510, wherein the camera enters the shooting standby state.

On the other hand, in the step S509, the camera microcomputer (processing unit) E01 performs a second control to cause the piezoelectric element 504 as the vibrator unit E14 to be driven to provide vibration to the LPF 503 as the optical member E13, and then the process proceeds to the step S510, wherein the camera enters the shooting standby state.

As described above, in the present embodiment, the first control causes the piezoelectric element 504 not to be driven, whereas the second control causes the piezoelectric element 504 to be driven for a predetermined time period. However, this is not limitative.

For example, the first control may be configured such that the piezoelectric element 504 is driven over a predetermined time period. In this case, the second control causes the piezoelectric element 504 to be driven for a longer time period than by the first control. No matter how the first and second control processes may be varied, when it is determined that a photographic lens mounting/removing operation was performed, the dust-removing unit is driven by a control which can provide a higher dust removing effect than when the photographic lens mounting/removing operation was not performed.

As described above, according to the present embodiment, when the position information on the contact brush 107-4 operated in a manner interlocked with the operation of the unlock button 107 differs immediately after execution of a power-on operation from that obtained immediately after execution of a power-off operation, it is judged that a photographic lens mounting/removing operation was performed during the power-off state, and processing for providing vibration to the optical member E13 is executed.

As a consequence, even if the photographic lens mounting/removing operation is performed in the power-off state or with the battery removed from the camera, resulting in attachment of dust to the optical member E13, the dust can be cleaned off the optical member E13 by vibrating the optical member E13, before shooting is performed. This makes it possible to avoid picking up the image of the dust to thereby prevent degradation of image quality.

It should be noted that even in the power-on state, whether or not a photographic lens mounting/removing operation was carried out may be determined by comparing the items of position information on the contact brush 107-4 operated in a manner interlocked with the operation of the unlock button 107. Further, although in the present embodiment, the dust-removing unit for removing dust from the optical member, such as an LPF, is added to the first embodiment, the dust-removing unit may be added to the second embodiment.

Figure 37:
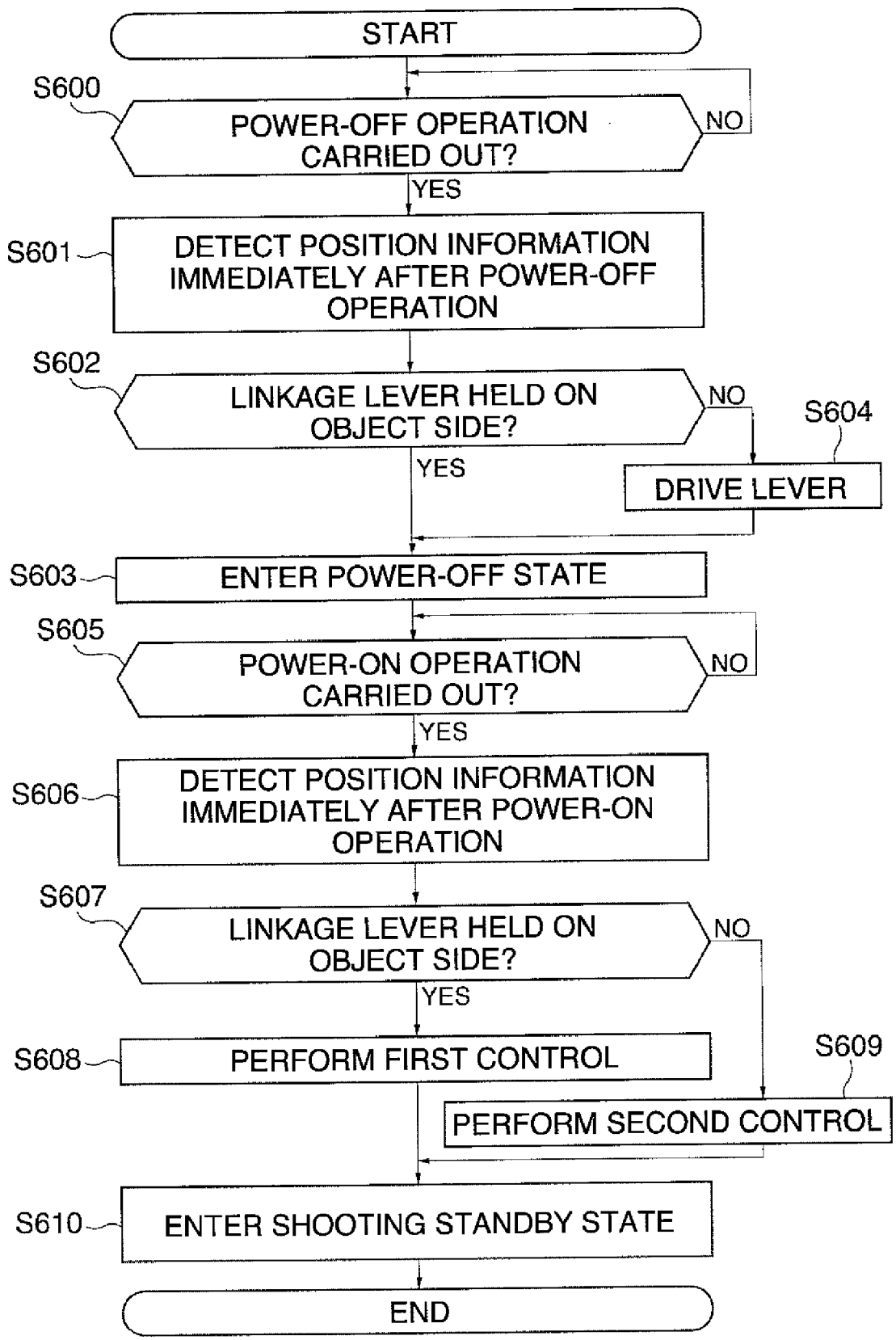
FIG. 37 is a flowchart useful in explaining an example of operation of a digital single-lens reflex camera according to a sixth embodiment of the present invention.
Figure 38:
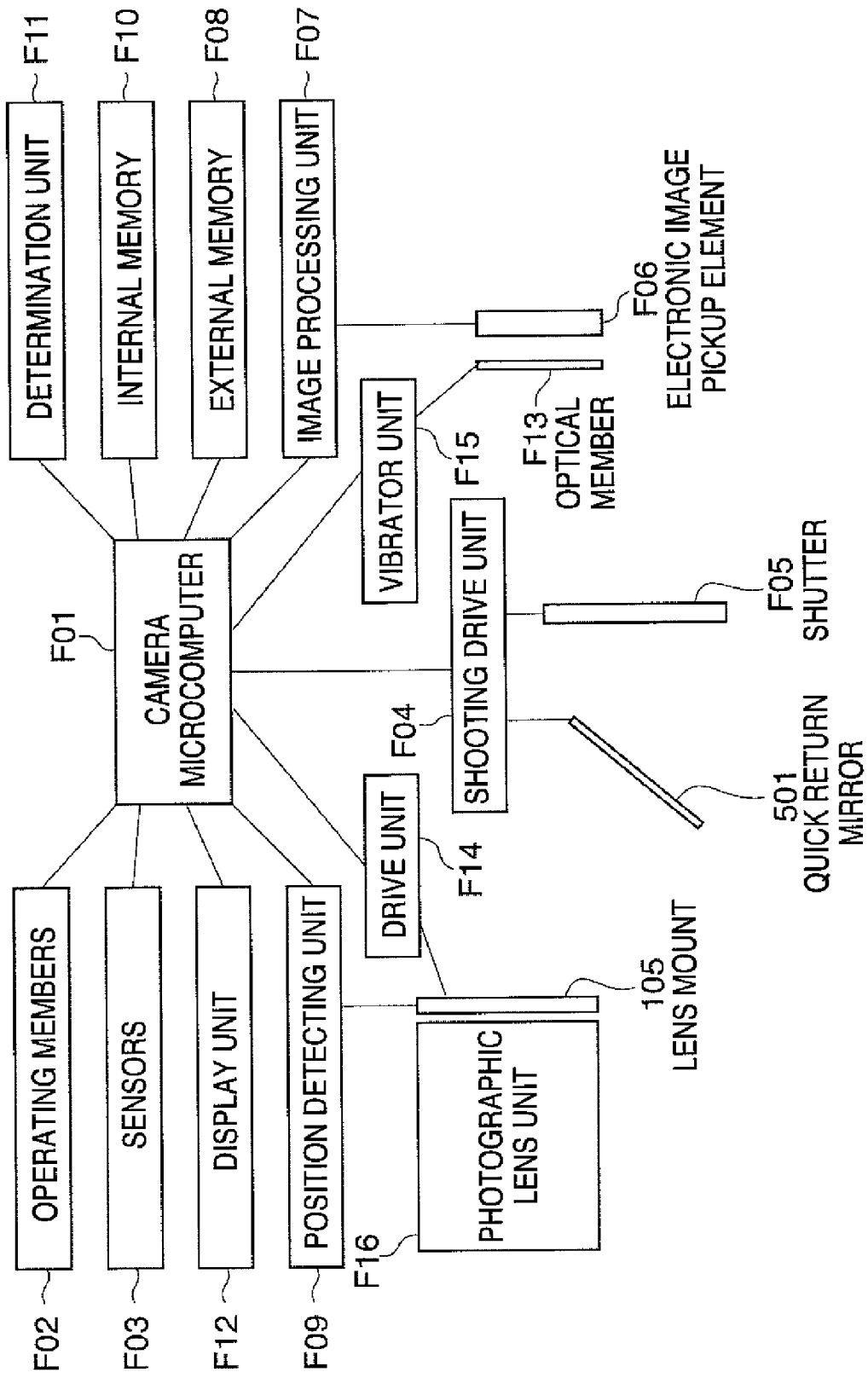
FIG. 38 is a control block diagram of the digital single-lens reflex camera according to the sixth embodiment.

Next, a digital single-lens reflex camera according to a sixth embodiment of the present invention will be described with reference to FIGS. 37 and 38. FIG. 37 is a flowchart useful in explaining an example of operation of the digital single-lens reflex camera according to the sixth embodiment, and FIG. 38 is a control block diagram of the digital single-lens reflex camera. The present embodiment is distinguished from the third embodiment only in that as in the fifth embodiment, there is additionally provided a dust-removing unit for removing dust from an optical member, such as an LFP. Therefore, description overlapping that of the third embodiment is omitted.

In the following, the example of the process of the digital single-lens reflex camera according to the sixth embodiment will be described with reference to FIGS. 37 and 38. Component parts and elements identical to those of the third and fifth embodiments are designated by identical reference numerals.

First, when a power-off operation is carried out in a step S600 in FIG. 37, the process proceeds to a step S601.

In the step S601, a camera microcomputer F01 drives the PI 302 as a position detecting unit F09 to detect whether or not the detected arm 300-a of the linkage lever 300 is in a position inserted in the PI 302, and obtains position information on the detected arm 300-a of the linkage lever 300 as a result of the detection, i.e. position information on the linkage lever 300 concerning whether the linkage lever 300 is held on the object side or on the photographer side. Although in the present embodiment, it is detected after execution of the power-off operation whether or not the detected arm 300-a is inserted in the PI 302, this is not limitative, but whether or not the detected arm 300-a is inserted in the PI 302 may be periodically detected to thereby employ a position information item of the detected arm 300-a obtained immediately before the power is turned off.

In a step S602, it is determined, based on the position information detected in the step S601, whether or not the linkage lever 300 is held on the object side. If it is determined that the linkage lever 300 is held on the object side, the process proceeds to a step S603, wherein if it is determined in the step S602 that the linkage lever 300 is held on the photographer side, the process proceeds to a step S604.

In the step S604, the camera microcomputer F01 drives the motor 305 as a drive unit F14 to shift the linkage lever 300 to the object side. When the linkage lever 300 is shifted to the object side, the detected arm 300-a is moved out of the PI 302. Therefore, the camera microcomputer F01 stops driving the motor 305, based on a change in a signal from the PI 302, and the process proceeds to the step S603, wherein the camera enters the power-off state. In short, after execution of the power-off operation, the linkage lever 300 is caused to be always in a state shifted to the object side. Even in the power-off state, the linkage lever 300 is constantly held on the object side by the urging force of the toggle spring 303.

When the power is turned off by the operation of the power switch member 102, the system stops and never performs an operation until a power-on operation is carried out by the power switch member 102, even if any other operation member A02 is operated (step S605). Insofar as the operation of the release button 104 for returning the camera from the sleep state to the ON state is concerned, it may be checked by interrupt handling in the step S605 whether or not the release button 104 was operated.

If it is determined in the step S605 that power-on operation has been carried out, the power is turned on to activate the system, and the process proceeds to a step S606.

In the step S606, immediately after execution of the power-on operation, the camera microcomputer F01 drives the PI 302 as the position detecting unit F09 to detects whether or not the detected arm 300-a of the linkage lever 300 is in the position inserted in the PI 302, i.e. obtains position information on the linkage lever 300 as a result of the detection, i.e. obtains position information on the linkage lever 300 concerning whether it is held on the object side or on the photographer side.

Then, in a step S607, it is determined, based on the position information detected in the step S606, whether or not the linkage lever 300 is held on the object side. If it is determined that the linkage lever 300 is held on the object side, a determination unit F11 judges that the photographic lens mounting/removing operation was not carried out, and the process proceeds to a step S608. On the other hand, if it is determined in the step S607 that the linkage lever 300 is held on the photographer side, the determination unit F11 judges that the photographic lens mounting/removing operation was carried out, and the process proceeds to a step S609.

In the step S608, the camera microcomputer (processing unit) F01 performs a first control to cause the piezoelectric element 504 as a vibrator unit F15 to be driven, and then the process proceeds to a step S610, wherein the camera enters the shooting standby state.

On the other hand, in the step S609, the camera microcomputer (processing unit) F01 performs a second control to cause the piezoelectric element 504 as the vibrator unit F15 to be driven to provide vibration to the LPF 503 as the optical member F13, and then the process proceeds to the step S610, wherein the camera enters the shooting standby state.

As described above, in the present embodiment, the first control causes the piezoelectric element 504 not to be driven, whereas the second control causes the piezoelectric element 504 to be driven for a predetermined time period. However, this is not limitative.

For example, the first control may be configured such that the piezoelectric element 504 is driven for a predetermined time period. In this case, the second control causes the piezoelectric element 504 to be driven for a longer time period than by the first control. No matter how the first and second control may be varied, when it is determined that a photographic lens mounting/removing operation was performed, the dust-removing unit is driven by a control which can provide a higher dust removing effect than when the photographic lens mounting/removing operation was not performed.

As described heretofore, according to the present embodiment, when the position information on the detected arm 300-a that moves in a manner interlocked with the operation of the unlock button 307 differs immediately after execution of a power-on operation from that obtained immediately after execution of a power-off operation, it is judged that a photographic lens mounting/removing operation was carried out during the power-off state, and processing for providing vibration to the optical member F13 is executed.

As a consequence, even if a photographic lens mounting/removing operation is performed in the power-off state or with a battery removed from the camera, resulting in attachment of dust to the optical member F13, the dust can be cleaned off the optical member F13 by vibrating the optical member F13, before shooting is performed. Thus, it is possible to avoid picking up the image of the dust to thereby prevent degradation of image quality.

It should be noted that even in the power-on state, whether or not a photographic lens mounting/removing operation was carried out may be determined by comparing items of position information on the detected arm 300-a that moves in a manner interlocked with the operation of the unlock button 307. Further, although in the present embodiment, the dust-removing unit for removing dust from the optical member, such as an LPF, is added to the third embodiment, the dust-removing unit may be added to the fourth embodiment.

While the present invention has been described with reference to exemplary embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2006-208652, Jul. 31, 2006 which is hereby incorporated by reference herein in its entirety.

What is claimed is:

1. An image pickup apparatus on which a photographic lens is removably held, comprising:
a movable unit configured to move in a manner interlocked with mounting/removing of the photographic lens;
a position detecting unit configured to detect a position of said movable unit; and
a determination unit configured to determine, based on position information on said movable unit detected by said position detecting unit, whether or not the photographic lens was mounted/removed;
wherein when the position information on said movable unit detected after execution of a power-off operation and the position information on said movable unit detected after execution of a power-on operation differ from each other, said determination unit determines that the photographic lens was mounted/removed.

2. An image pickup apparatus as claimed in claim 1, comprising a processing unit configured to carry out processing for cleaning an optical member when said determination unit determines that the photographic lens was mounted/removed.

3. An image pickup apparatus as claimed in claim 2, wherein the optical member is disposed between an image pickup element for converting light incident thereon from the photographic lens into an electric signal, and the photographic lens.

4. An image pickup apparatus as claimed in claim 1, comprising a storage unit configured to store the position information on said movable unit detected by said position detecting unit, and
wherein said determination unit determines, based on the position information stored in said storage unit, whether or not the photographic lens was mounted/removed.

5. An image pickup apparatus as claimed in claim 1, comprising an unlocking member configured to release engagement of the photographic lens, and
wherein said movable unit moves in a manner interlocked with an operation of said unlocking member.

6. An image pickup apparatus as claimed in claim 5, comprising a movement-converting unit including a rectilinear slide member configured to be capable of moving along an optical axis of the photographic lens in a manner interlocked with the operation of said unlocking member, and a rotary member provided with said movable unit and connected to said rectilinear slide member via a cam engagement part, said movement-converting unit converting movement of said rectilinear slide member along the optical axis to rotation of said rotary member by cam action of the cam engagement part.

7. An image pickup apparatus as claimed in claim 1, comprising an engagement unit for engagement with the photographic lens, and
wherein said movable unit moves in a manner interlocked with an operation for mounting/removing the photographic lens to/from said engagement unit.

8. An image pickup apparatus as claimed in claim 7, comprising a movement-converting unit including a rectilinear slide member configured to be capable of moving along an optical axis of the photographic lens in a manner interlocked with an operation for mounting/removing the photographic lens to/from said engagement unit, and a rotary member provided with said movable unit and connected to said rectilinear slide member via a cam engagement part, said movement-converting unit converting movement of said rectilinear slide member along the optical axis to rotation of said rotary member by cam action of the cam engagement part.

9. An image pickup apparatus as claimed in claim 8, wherein said engagement unit has a plurality of arcuate bayonet lugs circumferentially arranged, and said rectilinear slide member is disposed between circumferentially adjacent ones of said bayonet lugs.

10. An image pickup apparatus as claimed in claim 1, wherein said position detecting unit includes a conductive member provided in said movable unit, and an electric circuit member having a plurality of conductive traces, and said electric circuit member detects at least two items of position information each according to a position of the conductive member.

11. An image pickup apparatus as claimed in claim 1, comprising an unlocking member configured to release engagement of the photographic lens, and a drive unit configured to drive said movable unit, and
wherein said movable unit is configured to be movable between a first position and a second position, and when a power-off operation is carried out, said movable unit is driven by said drive unit to shift to the first position to be held in the first position, and when said unlocking member is operated, said movable unit shifts to the second position in a manner interlocked with the operation of said unlocking member, to be held in the second position, and
wherein when the position information on said movable unit detected after execution of the power-off operation and the position information on said movable unit detected after execution of the power-on operation differ from each other, said determination unit determines that the photographic lens was mounted/removed.

12. An image pickup apparatus as claimed in claim 1, comprising an unlocking member configured to release engagement of the photographic lens, and a drive unit configured to drive said movable unit, and
wherein said movable unit is configured to be movable between a first position and a second position, and said movable unit is driven by said drive unit to shift to the first position to be held in the first position, when a power-off operation is carried out, and shifts to the second position in a manner interlocked with the operation of said unlocking member, to be held in the second position, and
wherein when the position information on said movable unit detected after execution of the power-off operation and the position information on said movable unit detected after execution of a power-on operation differ from each other, said determination unit determines that the photographic lens was mounted/removed.

13. An image pickup apparatus as claimed in claim 12, wherein said engagement unit has a plurality of arcuate bayonet lugs circumferentially arranged, and said movable unit is disposed between circumferentially adjacent ones of said bayonet lugs.

14. An image pickup apparatus as claimed in claim 11, wherein said movable unit is configured to be movable along the optical axis of the photographic lens, and is provided with a toggle spring for urging said movable unit toward one side or an opposite side in a direction along the optical axis.

15. An image pickup apparatus as claimed in claim 12, herein said movable unit is configured to be movable along the optical axis of the photographic lens, and is provided with a toggle spring for urging said movable unit toward one side or an opposite side in a direction along the optical axis.

16. An image pickup apparatus as claimed in claim 11, wherein said position detecting unit optically detects the position of said movable unit.

17. An image pickup apparatus as claimed in claim 12, wherein said position detecting unit optically detects the position of said movable unit.

18. An image pickup apparatus as claimed in claim 11, wherein said position detecting unit electrically detects the position of said movable unit.

19. An image pickup apparatus as claimed in claim 12, wherein said position detecting unit electrically detects the position of said movable unit.

20. An image pickup apparatus as claimed in claim 1, comprising a vibrator unit configured to provide vibration to the optical member, and wherein when said determination unit determines that the photographic lens was not mounted/removed, said processing unit drives said vibrator unit by a first control, and when said determination unit determines that the photographic lens was mounted/removed, said processing unit drives said vibrator unit by a second control.

21. An image pickup apparatus as claimed in claim 20, wherein the first control causes said vibrator unit not to be driven, and the second control causes said vibrator unit to be driven for a predetermined time period.

22. An image pickup apparatus as claimed in claim 20, wherein the first control causes said vibrator unit to be driven for a predetermined time period, and the second control causes said vibrator unit to be driven for a longer time period than the predetermined time period.

23. An image pickup apparatus as claimed in claim 1, wherein when said determination unit determines that the photographic lens was mounted/removed, a processing unit carries out warning processing to advise cleaning of an optical member.

* * * * *